US012669465B2

(12) United States Patent
Verhelst et al.

(10) Patent No.: US 12,669,465 B2
(45) Date of Patent: Jun. 30, 2026

(54) STIMULATION CIRCUITRY FOR A MULTICHANNEL POTENTIOSTAT

(71) Applicants: KATHOLIEKE UNIVERSITEIT LEUVEN, Leuven (BE); UNIVERSITEIT GENT, Ghent (BE)

(72) Inventors: Marian Verhelst, Mechelen (BE); Tom Molderez, Heverlee (BE); Korneel Rabaey, Deinze (BE)

(73) Assignees: KATHOLIEKE UNIVERSITEIT LEUVEN, Leuven (BE); UNIVERSITEIT GENT, Ghent (BE)

( * ) Notice: Subject to any disclaimer, the term of this patent is extended or adjusted under 35 U.S.C. 154(b) by 424 days.

(21) Appl. No.: 18/032,705

(22) PCT Filed: Oct. 20, 2021

(86) PCT No.: PCT/EP2021/079120
§ 371 (c)(1),
(2) Date: Apr. 19, 2023

(87) PCT Pub. No.: WO2022/084405
PCT Pub. Date: Apr. 28, 2022

(65) Prior Publication Data
US 2023/0384260 A1 Nov. 30, 2023

(30) Foreign Application Priority Data
Oct. 20, 2020 (EP) ..................................... 20202926

(51) Int. Cl.
*G01N 27/416* (2006.01)

(52) U.S. Cl.
CPC .................................. *G01N 27/416* (2013.01)

(58) Field of Classification Search
CPC .............................. G01N 27/416; G01N 27/28
See application file for complete search history.

(56) References Cited

U.S. PATENT DOCUMENTS

| | | | |
|---|---|---|---|
| 7,043,402 B2 | 5/2006 | Phillips et al. | |
| 2003/0065461 A1* | 4/2003 | Yoon ................... | G01R 31/2839 |
| | | | 702/76 |

(Continued)

FOREIGN PATENT DOCUMENTS

| | | | | |
|---|---|---|---|---|
| CA | 3060849 A1 | 2/2020 | | |
| WO | WO-0133207 A1 * | 5/2001 | ......... | G01N 33/4836 |

(Continued)

OTHER PUBLICATIONS

Adams, et al., "MiniStat: Development and Evaluation of a Mini-Potentiostat for Electrochemical Measurements", IEEE Access, vol. 7, Mar. 4, 2019, pp. 31903-31912.

(Continued)

*Primary Examiner* — Shelby A Turner
*Assistant Examiner* — Cynthia L Davis
(74) *Attorney, Agent, or Firm* — Workman Nydegger

(57) ABSTRACT

A stimulation circuitry for a multichannel potentiostat has individually controllable stimulation channels, and includes at least one circuit group. The circuit group includes: (i) a controllable current source; (ii) a transient suppression module having an input resistively coupled to an output of the current source, the transient suppression module being a module for controllably suppressing a transient current with respect to an output of said transient suppression module; (iii) a demultiplexer having an input resistively coupled to the output of the transient suppression module; and (iv) a controller for selecting an output of the demultiplexer and for operating the transient suppression module with respect to said output selection.

17 Claims, 10 Drawing Sheets

(56) References Cited

U.S. PATENT DOCUMENTS

| 2009/0120810 | A1* | 5/2009 | Phan | A61B 5/1486 |
| | | | | 205/792 |
| 2017/0265789 | A1 | 9/2017 | Naseri et al. | |

FOREIGN PATENT DOCUMENTS

| WO | 2016197245 | A1 | 12/2016 |
| WO | 2017132564 | A2 | 8/2017 |

OTHER PUBLICATIONS

Dennis et al., "Anode Potential Influences the Structure and Function of Anodic Electrode and Electrolyte-Associated Microbiomes", Scientific Reports, Dec. 19, 2016, pp. 1-11.

Dragas, et al., "Multi-Functional Microelectrode Array Featuring 59760 Electrodes, 2048 Electrophysiology Channels, Stimulation, Impedance Measurement, and Neurotransmitter Detection Channels", IEEE Journal of Solid- State Circuits, vol. 52, No. 6, Jun. 1, 2017, pp. 1-31.

Eversmann, et al., "A 128×128 CMOS Biosensor array for Extracellular Recording of Neural Activity", IEEE Journal of Solid-State Circuits, vol. 38, No. 12, Dec. 1, 2003, pp. 2306-2317.

Giagkoulovits, et al., "A 16×16 CMOS Amperometric Microelectrode Array for Simultaneous Electrochemical Measurements", IEEE Transactions on Circuits and Systems I: Regular Papers, vol. 65, No. 9, Sep. 1, 2018, pp. 2821-2831.

Jung, et al., "A CMOS Multimodality In-Pixel Electrochemical and Impedance Cellular Sensing Array for Massively Paralleled Synthetic Exoelectrogen Characterization", 2020 IEEE International Solid-State Circuits Conference—(ISSCC), Feb. 19, 2020, pp. 436-438.

Levar et al., "Redox Potential as a Master Variable Controlling Pathways of Metal Reduction by Geobacter Sulfurreducens", The ISME Journal, vol. 11, Jan. 3, 2017, pp. 741-752.

Li, et al., "A 64-channel, 1.1-pA-accurate On-chip Potentiostat for Parallel Electrochemical Monitoring", ESSCIRC 2019—IEEE 45th European Solid State Circuits Conference (ESSCIRC), Sep. 23-26, 2019, pp. 317-320.

Manickam, et al., "A CMOS Biosensor Array with 1024 3-Electrode Voltammetry Pixels and 93dB Dynamic Range", IEEE International Solid-State Circuits Conference (ISSCC), Session 11, Feb. 19, 2019, pp. 192-194.

Molderez, et al., "A Current-Driven Six-Channel Potentiostat for Rapid Performance Characterization of Microbial Electrolysis Cells", IEEE Transactions on Instrumentation and Measurement, Mar. 1, 2019, pp. 1-10.

Molderez, et al., "An Affordable Multichannel Potentiostat with 128 Individual Stimulation and Sensing Channels", IEEE International Instrumentation and Measurement Technology Conference (I2MTC), May 25, 2020, pp. 1-6.

Nazari, et al., "CMOS Neurotransmitter Microarray: 96-channel Integrated Potentiostat with On-Die Microsensors", IEEE Transactions on Biomedical Circuits and Systems, vol. 7, No. 3, Jun. 1, 2013, pp. 338-348.

Pruna, et al., "A Low-Cost and Miniaturized Potentiostat for Sensing of Biomolecular Species Such as TNF-$\alpha$ by Electrochemical Impedance Spectroscopy", Biosensors and Bioelectronics, vol. 100, Feb. 15, 2018, pp. 533-540.

"AN-1515 A Comprehensive Study of the Howland Current Pump", Texas Instruments, Application Report SNOA474A, Apr. 1, 2013, pp. 1-17.

Vergani, et al., "Multichannel Bipotentiostat Integrated with a Microfluidic Platform for Electrochemical Real-Time Monitoring of Cell Cultures", IEEE Transactions on Biomedical Circuits and Systems, vol. 6, No. 5, Oct. 2012, pp. 498-507.

Wagner, et al., "Optimal Set Anode Potentials Vary in Bioelectrochemical Systems", Environmental Science & Technology, vol. 44, Jul. 1, 2010, pp. 6036-6041.

Zhang et al., "Rapid and Quantitative Assessment of Redox Conduction Across Electroactive Biofilms by Using Double Potential Step Chronoamperometry", ChemElectroChem Articles, Apr. 1, 2017, pp. 1026-1036.

Extended European Search Report from corresponding European Patent Application No. EP20202926.0, Mar. 16, 2021.

International Search Report from corresponding PCT Application No. PCT/EP2021/079120, Jan. 18, 2022.

* cited by examiner

STIMULATION CIRCUITRY FOR A MULTICHANNEL POTENTIOSTAT

TECHNICAL FIELD OF THE INVENTION

The present invention relates to multichannel potentiostats and more in particular to stimulation circuitry therefor.

BACKGROUND OF THE INVENTION

Electrochemical reactions are essential for numerous classical chemical applications like energy generation and storage, material coatings and corrosion protection, redox sensing, understanding neural activity, as well as for exploring novel synergies with microorganisms for example in bioelectrochemical systems (BESs). These reactions are characterized by an electrical current, which is proportional to the chemical reaction rate and an electrical voltage which directs if a reaction is either spontaneous or non-spontaneous. A standard potentiostat, in three-electrode configuration (FIG. 1), can be used to study these electrochemical redox processes for reaction optimization and increased understanding. This instrument stimulates the counter electrode (CE) of the electrochemical system such that a target voltage is set between the working electrode (WE) and the reference electrode (RE), i.e. electrochemical potential, and measures the resulting current over time with respect to the WE.

Many of these electrochemical experiments, especially for corrosion research and BES research, are time-consuming, with a single experiment easily lasting a few days to several months. Moreover, several replicates are required for lowering the standard deviation to obtain statistically sound results. To this end, a potentiostat with multiple stimulation and sensing channels would greatly increase the experiment throughput by parallel execution. The state of the art focuses on increasing the amount of sensing channels for spatial information retrieval in so-called microelectrode arrays (MEAs) (FIG. 2). The absence of multiple stimulation channels however results in no support for a unique stimulation pattern for each channel. Commercial instruments provide parallel operation with top-notch channel performance, although at an expensive and bulky channel design, making large-scale channel upscaling unfeasible. Recent works have lowered the cost-per-channel, from $120 to $20, as well as the channel footprint but only for up to 8 individual channels.

The state-of-the-art multichannel potentiostat works can be divided into three groups: the integrated circuit (IC) complementary metal-oxide-semiconductor (CMOS) microelectrode arrays (MEAs), the commercial instruments and the low-cost potentiostats. Neural research motivated the development of the original MEAs. Eversmann et al. developed a 16384-electrode sensor array for spatial neural activity imaging. Each electrode was sequentially readable, simultaneous individual stimulation was not supported (EVERSMANN, Björn, et al. A 128×128 CMOS biosensor array for extracellular recording of neural activity. *IEEE Journal of Solid-State Circuits*, 2003, 38.12: 2306-2317). The number of sensor electrodes was further upscaled by Dragas et al. to 59760 together with integration of 6 different measurement modalities (DRAGAS, Jelena, et al. In vitro-multi-functional microelectrode array featuring 59 760 electrodes, 2048 electrophysiology channels, stimulation, impedance measurement, and neurotransmitter detection channels. *IEEE journal of solid-state circuits*, 2017, 52.6: 1576-1590). Despite the massive number of electrodes, only 2048 could be sequentially sensed using a combination of 32 64-to-1 analog multiplexers and 32 ADCs. The number of stimulation channels was even further restricted, with only 16 stimulation units available. Nazari et at. upscale the readout circuitry to 96 individual sensing channels (NAZARI, Meisam Honarvar, et al. CMOS neurotransmitter microarray: 96-channel integrated potentiostat with on-die microsensors. *IEEE transactions on biomedical circuits and systems*, 2012, 7.3: 338-348). The current was measured with an ADC combining current-to-frequency and single-slope technologies. However, potential control was only supported for a two-electrode setup which does not shield the WE response from the CE behaviour. Giagkoulovits et al. presented a three-electrode MEA with 256 electrodes and 16 stimulation units (GIAGKOULOVITS, Christos, et al. A 16×16 CMOS amperometric microelectrode array for simultaneous electrochemical measurements. *IEEE Transactions on Circuits and Systems I: Regular Papers*, 2018, 65.9: 2821-2831). Again, the number of stimulation channels was much lower than the number of sensing channels. The number of three-electrodes was increased to 1024 by Manickam et al. (MANICKAM, Arun, et al. 11.2 A CMOS biosensor array with 1024 3-electrode voltammetry pixels and 93 dB dynamic range. In: 2019 *IEEE International Solid-State Circuits Conference—(ISSCC)*. IEEE, 2019. p. 192-194). Sampling of all electrodes simultaneously occurred at 50 Hz, but only two dedicated stimulation units were provided. Supporting the same number of electrodes the amount of stimulation channels was increased to 16 by Jung et al., while the readout speed was increased to 1 MHz for each electrode (JUNG, Doohwan, et al. 28.4 A CMOS Multimodality In-Pixel Electrochemical and Impedance Cellular Sensing Array for Massively Paralleled Synthetic Exoelectrogen Characterization. In: 2020 *IEEE International Solid-State Circuits Conference—(ISSCC)*. IEEE, 2020. p. 436-438). The first work with an individual stimulation channel for each electrode was the 64-channel MEA of Li et al., but a complex electrode post-processing limited the practical deployment of this array for electrochemical measurements (LI, Peishuo, et al. A 64-channel, 1.1-pA-accurate On-chip Potentiostat for Parallel Electrochemical Monitoring. In: *ESSCIRC 2019-IEEE 45th European Solid State Circuits Conference (ESSCIRC)*. IEEE, 2019. p. 317-320).

The second group are the commercial instruments, which provide top-notch channel performance with the possibility of a multichannel instrument with a limited number (e.g. between 8 and 32) of individual channels. The advantage of having single, independent modules is a very flexible platform, completely customizable for a particular application. Largescale up-scaling of the amount of channels for high-throughput experiments is however economically not feasible due to the expensive price-per-channel, which is in the order of $1000-$10000.

The third group contains the low-cost potentiostats, developed using inexpensive commercial off-the-shelf (COTS) components and PCB technology. Production costs for a single channel have been lowered from $120 to $20 by the state of the art (see e.g. ADAMS, Scott D., et al. MiniStat: Development and evaluation of a mini-potentiostat for electrochemical measurements. *IEEE access*, 2019, 7: 31903-31912). Multiple channels were not supported by these works (although one could always combine multiple devices separately). Vergani et al. proposed a 24-channel sensing potentiostat, although with only a single stimulation channel (VERGANI, Marco, et al. Multichannel bipotentiostat integrated with a microfluidic platform for electrochemical real-time monitoring of cell cultures. *IEEE Transactions on Biomedical Circuits and Systems,* 2012, 6.5: 498-507). A true multichannel device with 8 sensing and stimulation channels was developed Pruna et al. and with 6 channels by Molderez et al. (PRUNA, Raquel, et al. A low-cost and miniaturized potentiostat for sensing of biomolecular species such as TNF-α by electrochemical impedance spectroscopy. *Biosensors and Bioelectronics,* 2018, 100: 533-540. MOLDEREZ, Tom R., et al. A current-driven six-channel potentiostat for rapid performance characterization of microbial electrolysis cells. *IEEE Transactions on Instrumentation and Measurement,* 2019, 68.12: 4694-4702). These works shared a single microcontroller across multiple channels to lower the channel cost and area. With COTS mixed-signal ADCs and DACs typically limited to 8 dedicated channels, a much more aggressive hardware strategy is required to further upscale the channel amount.

One area in which a large number of parallel stimulation and sensing channels can be highly beneficial is in the field of electromicrobiology, such as microbial electrochemistry. Electroactive microorganisms exchange electrons with minerals or solid electrodes and are found in many different environments. Some of these microorganisms can structure themselves in electroactive biofilms (EABs) and perform either indirect (IET) or direct (DET) electron transfer with a conductive surface. Those EABs can be either anodic (transferring electrons from a metabolically oxidized substrate to an electrode) or cathodic (harvesting electrons from a cathode to perform a reduction). Several applications have been proposed for exploiting the unique ability of those microorganisms. In a microbial fuel cell, microorganisms oxidize biodegradable organic compounds and transfer the corresponding low potential electrons to an anode, allowing for small electric power generation while treating wastewater. Microbial electrosynthesis uses external power to drive microbial metabolism into producing valuable organic components in a cathodic compartment of an electrolysis cell. Microbial electrodes have been proposed as a novel amperometric biosensor for bioprocess or environmental monitoring due to the fast response of their current towards environmental changes. Almost all processes still suffer from low performance, and mechanisms behind DET are not fully unresolved. This has stimulated both fundamental level and applied research. Unfortunately, research progression is slow because of the challenges with the dedicated experimental setups. Experiments with EABs typically last from days to months, often with high variability between replicates, especially when EABs are grown in separate reactors. Furthermore, the potentiostats needed to control the electric input and characterize the electrochemical properties of EABs are expensive, with a premium price-per-channel in the order of $1000-10000, allowing to study only a few EABs simultaneously. This combination of long experiment time and expensive equipment severely limits experiment throughput.

For example, current studies are generally capable of simultaneously testing only 3 to 8 individual electrochemical potentials with only up to 3 replicates in the best case. An overview of such studies can be found in Wagner et al. (2010) (WAGNER, Rachel C.; CALL, Douglas F.; LOGAN, Bruce E. Optimal set anode potentials vary in bioelectrochemical systems. *Environmental science & technology,* 2010, 44.16: 6036-6041). Those low-throughput methods often induce a substantial variation in results and associated conclusions which impedes true progress in the field of microbial electrochemistry. For example, multiple studies have reported the impact of constant electrode potential on the development and performance of anodic EABs without scientific consensus even for identical pure cultures or comparable mixed-communities. Furthermore, while all the aforementioned studies reported an impact of constant electrode potentials, it has been shown that growing anodic EABs under periodic polarization of the underlying electrode could substantially improve the conductivity and overall performance of the EABs. The fact that a dynamic electrical input could also be used to optimize EABs tremendously increases the number of relevant test available, as now also the frequency of polarity switching becomes a key parameter.

All the aforementioned reasons call for high-throughput systems allowing for simultaneous testing of multiple electric signals with a sufficient number of technical replicates.

There is thus still a need in the art for multichannel potentiostats and associated systems which address at least some of the issues outlined above.

SUMMARY OF THE INVENTION

It is an object of the present invention to provide good simulation circuitry for a multichannel potentiostat. It is a further object of the present invention to provide good a multichannel potentiostat, methods and uses associated therewith. This objective is accomplished by simulation circuitry, multichannel potentiostats, methods and uses according to the present invention.

It is an advantage of embodiments of the present invention that each stimulation channel can have an associated sensing channel.

It is an advantage of embodiments of the present invention that the simulation circuitry can individually stimulate a relatively large number (e.g. 100 or more) of stimulation channels. It is a further advantage of embodiments of the present invention that the simulation circuitry and/or multichannel potentiostat are highly scalable in terms of the number of channels.

It is a further advantage of embodiments of the present invention that the simulation circuitry and/or multichannel potentiostat can make extensive use of hardware sharing, thereby reducing the amount of dedicated components needed per channel. It is a further advantage of embodiments of the present invention that a relatively low-area channel architecture can be realized. It is yet a further advantage of embodiments of the present invention that a relatively low-cost channel architecture can be realized.

It is an advantage of embodiments of the present invention that time division multiplexing may be exploited in order to efficiently address each of the plurality of channels.

It is an advantage of embodiments of the present invention that—other than the bandwidth, which is a calculated trade-off—the channel performance is generally not compromised; for example, it may be on par or better compared to the state of the art.

It is an advantage of embodiments of the present invention that a sensing channel may be sensed through two different paths, thereby allowing to the sensing channel voltage to be determined independently from the operation of the stimulation circuitry.

It is an advantage of embodiments of the present invention that the simulation circuitry and/or multichannel potentiostat can be implemented on a well-known, well-accessible and modular technology platform (e.g. printed circuit board technology). It is a further advantage of embodiments of the present invention that the simulation circuitry and/or multichannel potentiostat can be built using relatively inexpensive off-the-shelf components.

It is an advantage of embodiments of the present invention that a transient current-which e.g. arises when switching channels—can be suppressed. It is a further advantage of embodiments the present invention that a minimum current pulse time needed to achieve a predetermined delivered charge accuracy can be kept low. It is a yet a further advantage of embodiments of the present invention that this positively affects the switching frequency, and thereby the voltage ripple of the stimulation channels and/or the number of stimulation channels that can be addressed (e.g. stimulated) in a given time frame.

It is an advantage of embodiments of the present invention that a plurality of electrochemical experiments can be executed in parallel. It is a further advantage of embodiments the present invention that electrochemical experiments can thereby be sped up considerably (e.g. by a factor equal to the number of stimulation channels). It is yet a further advantage of embodiments of the present invention that it can enable new avenues in fields such as electromicrobiology and/or for performing existing experiments (e.g. slow cyclic voltammetry).

It is an advantage of embodiments of the present invention that the multichannel potentionstat can be coupled to a variety of electrodes, e.g. a variety of (external) electrode arrays. It is a further advantage of embodiments of the present invention that the electrodes can be tailored to a desired application independently from the stimulation circuitry and/or the multichannel potentiostat; e.g. allowing to use biocompatible electrodes for bioelectrochemical measurements.

In a first aspect, the present invention relates to a stimulation circuitry for a multichannel potentiostat having individually controllable stimulation channels, comprising at least one circuit group, the circuit group comprising: (i) a controllable current source; (ii) a transient suppression module having an input resistively coupled to an output of the current source, the transient suppression module being a module for controllably suppressing a transient current with respect to an output of said transient suppression module; (iii) a demultiplexer having an input resistively coupled to the output of the transient suppression module; and (iv) a controller for selecting an output of the demultiplexer and for operating the transient suppression module with respect to said output selection.

In a second aspect, the present invention relates to a multichannel potentiostat having individually controllable stimulation channels, comprising the stimulation circuitry according to any embodiment of the first aspect.

In a third aspect, the present invention relates to a method for operating a stimulation circuitry as defined in any embodiment of the first aspect, comprising using the controller to select an output of the demultiplexer while suppressing a transient current with respect to the output of the transient suppression module.

In a fourth aspect, the present invention relates to a method for operating a multichannel potentiostat as defined in any embodiment of the second aspect, comprising the method according to any embodiment of the third aspect and further comprising: (a) determining a potential of a sensing channel associated with a working electrode connector, and (b) setting—in function of the determined potential—a stimulation current for achieving a predetermined target potential for a stimulation channel associated with the same working electrode connector.

In a fifth aspect, the present invention relates to a use of a transient suppression module, being a module for controllably suppressing a transient current with respect to an output of said transient suppression module, for reducing a minimum current pulse time needed to achieve a predetermined delivered charge accuracy in a stimulation circuitry for a multichannel potentiostat.

In a sixth aspect, the present invention relates to a use of a multichannel potentiostat as defined in any embodiment of the second aspect for concurrently performing a plurality of electrochemical measurements in parallel, preferably bioelectrochemical measurements.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figures 1, 2, 3, 4, 5, 6, 7:
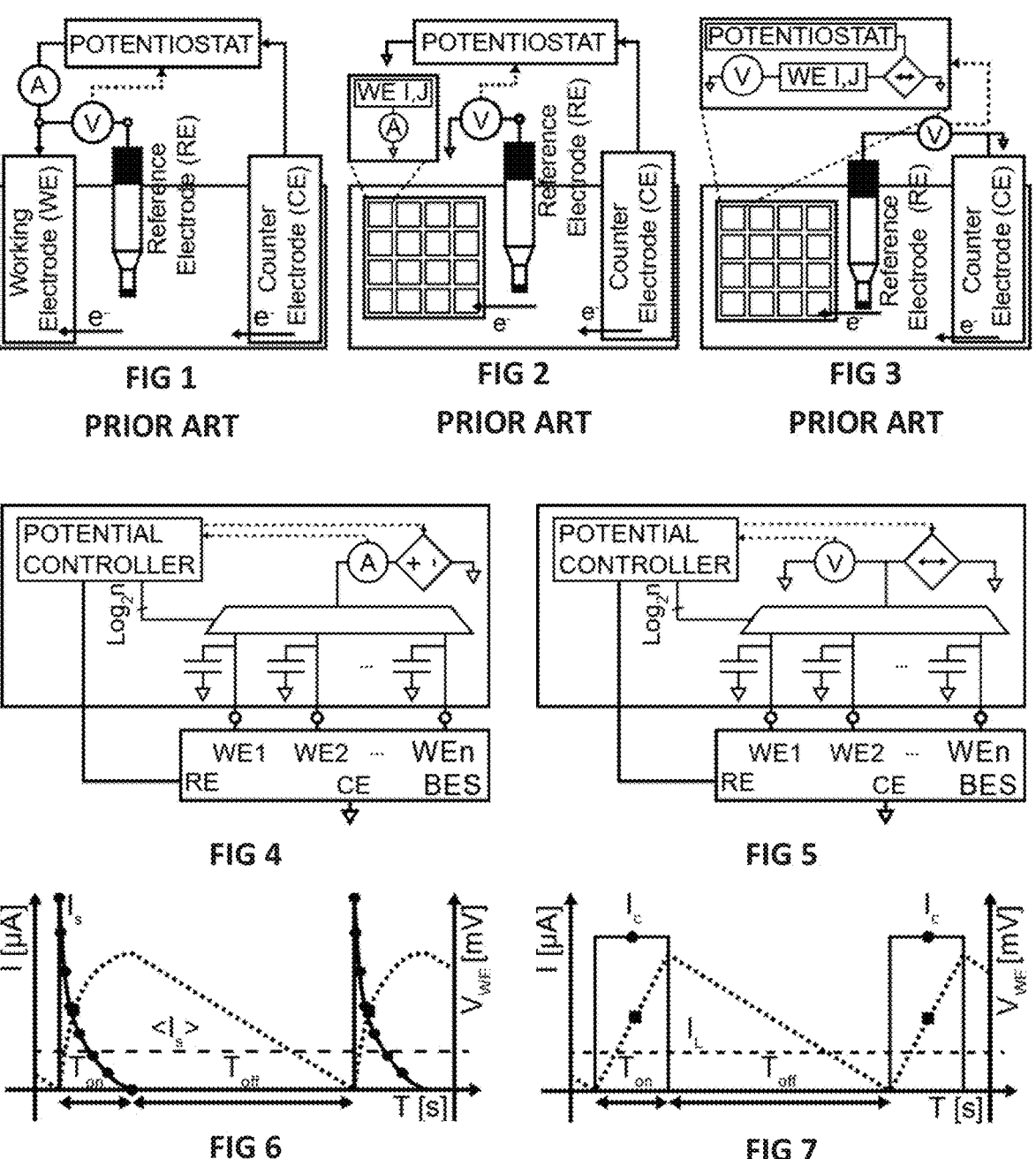
FIG. 1, FIG. 2 and FIG. 3 are schematic representations of electrochemical three-electrode experiment setups with respectively a classical, single-channel electrode setup; a microelectrode array (MEA) with a single stimulation channel and multiple working electrodes (WE[i][j]) and readout circuitry; and a truly parallel setup with multiple working electrodes each having its own stimulation and readout channel.
FIG. 4 and FIG. 5 are schematic representations of the circuitry of a controllable voltage source and a controllable current source, respectively.
FIG. 6 and FIG. 7 are graphs of the charge signal waves for the controllable voltage source of FIG. 4 and the controllable current source of FIG. 5, respectively. The dots indicate the discrete samples required for digitizing the signal.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable with their antonyms under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

The following terms are provided solely to aid in the understanding of the invention.

As used herein, and unless otherwise specified, a multi-channel potentiostat is a potentiostat having a plurality of stimulation channels and/or a plurality of sensing channels. In contrast to some of the prior art (cf. supra), a multichannel potentiostat in accordance with the present invention typically has at least the plurality of stimulation channels; preferably both the plurality of stimulation channels and/or the plurality of sensing channels. Note further that—while reference is made to 'stimulations channels' on the one hand, and 'sensing channels' on the other—a particular channel is in embodiments not necessarily strictly one or the other, but may be both (cf. infra). Moreover, it may be both concurrently (i.e. both at the same point in time), sequentially (i.e. one at one point in time and the other at another point) or a mix thereof. The explicit specification of one or the other in those cases is then but meant to emphasize that function which is most relevant in the particular context.

As used herein, and unless otherwise specified, a demultiplexer can be considered as a switch having an input and a plurality of outputs, the input being selectably couplable to one of the outputs. In order to select which output is coupled to the input, the demultiplexer may typically further comprise one or more selectors (e.g. selection lines). That said, a demultiplexer may often be functionally interchangeable (or even equivalent) with a corresponding multiplexer having inputs and outputs reversed (i.e. a switch having a same plurality of inputs and an output, the output being selectably couplable to one of the inputs). These terms can therefore mutatis mutandis be used to refer to a same entity. Generally, the former nomenclature is used in the claims and associated description, but the latter is used in the examples and depicted in the accompanying drawings.

In a first aspect, the present invention relates to a stimulation circuitry for a multichannel potentiostat, comprising at least one circuit group, the (e.g. each) circuit group comprising: (i) a current source; (ii) a transient suppression module having an input resistively coupled to an output of the current source, the transient suppression module being a module for controllably suppressing a transient current with respect to an output of said transient suppression module; (iii) a demultiplexer having an input resistively coupled to the output of the transient suppression module; and (iv) a controller for selecting an output of the demultiplexer and for operating the transient suppression module with respect to said output selection.

The stimulation circuitry is typically suited for a multichannel potentiostat having individually controllable stimulation channels (e.g. cf. the second aspect). This is achieved by the current source being controllable (so that its output can be tuned—e.g. continuously within a given range—thereby allowing the stimulation current to be modulated) and resistively coupled through the transient suppression module—to the demultiplexer which allows to individually select a stimulation channel.

A current-rather than a voltage-source is used in the present invention for stability reasons (cf. Example 1, I.A). In embodiments, the current source may be a digital controlled current source; i.e. the current or voltage for controlling the current source may be computed in the digital domain. This may for example be done by the controller, e.g. by a (digital) LQI controller or the like in said controller (cf. infra). Digitally computing the control advantageously allows to make more complex calculations and thereby achieve a more intelligent control. For example, the current source may be controlled to output a calibrated stimulation current needed to reach a desired target potential starting from a measured/determined present channel voltage, while simultaneously compensating for channel-to-channel cross-talk (cf. embodiments of the fourth aspect). In embodiments, the current source may be a voltage-controlled current source. In embodiments, the voltage-controlled current source may comprise a Howland current pump, preferably a modified Howland current pump. Such a modified (also referred to as 'improved') Howland current pump is a modification of a so-called 'basic' Howland current pump. A detailed account of both the basic and modified Howland current pump are given in an application note by Texas Instruments (TEXAS INSTRUMENTS. AN-1515 A Comprehensive Study of the Howland Current Pump. Application report SNOA474A, 2013), which is incorporated herein by reference. In embodiments, the modified Howland current pump may be a modified Howland current pump with buffered feedback; i.e. the modified Howland current pump may comprise an additional negative-feedback amplifier in the feedback path of the current pump, as e.g. depicted in FIG. 9. Current sources based on a modified Howland current pumps—especially those with buffered feedback—were found to be particularly suited for use in the current invention. For example, they have a bidirectional current output and were found to have excellent performance characteristics for the purpose and this at a comparatively low cost. In the past, Howland current pumps were often looked over because they suffered from internal resistor mismatch; however, today's Howland current pumps were found to have a very good performance in the present context. Nevertheless, it will be clear that the invention is not limited to current sources based on the aforementioned current pumps and that other current source architectures can also be envisioned.

In embodiments, the current source may further comprise a unipolar-to-bipolar convertor. In embodiments, an output of the unipolar-to-bipolar convertor may be resistively coupled to an input of the current pump (e.g. the modified Howland current pump). The unipolar-to-bipolar convertor may advantageously be used to couple a channel digital-to-analog converter (cf. infra) with the current pump. In embodiments, the unipolar-to-bipolar convertor may be a unipolar-to-bipolar convertor with a low-pass filter (which could alternatively be referred to as a 'unipolar-to-bipolar low-pass filter', cf. infra). The low pass filter may advantageously be used to filter high-frequency signals (e.g. from the DAC) that might distort the current source.

The transient (current) suppression module is typically a module for controllably suppressing a current with respect to the output of said transient suppression module, meaning that the current can be suppressed when the transient suppression module is operated to do so (e.g. by means of the controller); i.e. it could typically more generally be referred to as a '(current) suppression module'. In embodiments, suppressing the current with respect to the output may comprise routing the current way from the output; e.g. into a voltage buffer (cf. infra). Although not necessarily strictly limited thereto, the transient suppression module is within the present invention commonly used (cf. third aspect) to suppress transient currents that occur when switching between outputs (i.e. selecting a different output) of the demultiplexer; in this regard, it is herein most typically referred to as a '(current) transient suppression module' (as opposed to a '(current) suppression module'). In embodiments, the transient suppression module may be operable in a digital manner (i.e. the suppression may be either 'on'/active or 'off'/inactive). In such cases, the transient suppression module may also be referred to as a digital transient suppression module.

In Molderez et al. (2020) (MOLDEREZ, Tom R.; RABAEY, Korneel; VERHELST, Marian. An Affordable Multichannel Potentiostat with 128 Individual Stimulation and Sensing Channels. In: 2020 *IEEE International Instrumentation and Measurement Technology Conference* (*I2MTC*). IEEE, 2020. p. 1-6)—which is incorporated herein by reference—a multichannel potentiostat was disclosed that makes extensive use of time-shared hardware to achieve a low-cost (<$5) and low-area (≈93 mm²) potentiostat channel architecture suitable for a >100-channel device. For example, the stimulation circuitry therein comprised a dedicated capacitor and switch per stimulation channel, but the digital-to-analog converter, bipolar current pump and analog demultiplexer are shared between a plurality of channels. However, the current pump has a finite rise- and fall-time, so that—upon switching channels (i.e. switching outputs of the demultiplexer)—an unknown transient current flows from the current pump. For example, the channel switching may go together with setting a different output current for the controllable current source; e.g. because the output current may be set in function of the charge that is to be stored in—and thus delivered to—each channel. Alternatively or complimentary, the switching action may cause an impedance swing; e.g. because the switching channels are a different load voltage. Such factors momentarily result in a hard to predict current injection (i.e. a transient current) from the current pump before stabilizing. As such, in order to achieve some predetermined accuracy of the delivered charge, overcoming this uncertain factor requires the current pulse to be upheld for a minimum amount of time; i.e. there is a lower-bound to the stimulation on-time $T_{on}$. Yet, as $T_{on}$ increases, the switching frequency decreases and the time $T_{off}$ between subsequent stimulations of a given channel (e.g. a given demultiplexer output) increases. Between stimulations, the charge stored in each channel (e.g. in each capacitor) drops over time, so that a longer $T_{off}$ negatively results in a larger voltage ripple $\Delta V$. Or alternatively, for a certain acceptable voltage ripple, a higher $T_{on}$ means that less outputs can be cycled through in a given time frame.

As part of the present invention, the inventors therefore surprisingly conceived the use of the transient suppression module for—when switching outputs of the demultiplexer—suppressing the current output by the current source for a time $T_D$ (≥the transient time $T_T$ needed to stabilize the current) before coupling the said current output to the demultiplexer (through the transient suppression module's output), thereby greatly reducing the minimum value of $T_{on}$ for a predetermined delivered charge accuracy. This in turn advantageously allows to reduce the voltage ripple $\Delta V$, or—for a certain acceptable voltage ripple—increase the number of demultiplexer outputs (e.g. channels) that can be stimulated by a single current source in a given time frame. The abovementioned is also discussed in detail in Example 1, particularly part I therein (e.g. with respect to FIG. 10).

In embodiments, the transient suppression module may comprise: (ii') a voltage buffer, and (ii") a switch having an input resistively coupled to the output of the current source, a first output resistively coupled to the voltage buffer (e.g. to an input thereof), and a second output resistively coupled to an input of the demultiplexer.

In embodiments, an output of the voltage buffer may be resistively coupled to an input of the demultiplexer. The voltage buffer may thereby advantageously follow the potential of the currently switched—to output of the demultiplexer (and thus in turn e.g. the channel coupled to said output). This characteristic may be benefited from in two ways: it allows—while suppressing the current (e.g. the transient current)—, to nevertheless stabilize said current against the correct voltage (cf. supra and infra), and it can be used for sensing the channel potential (cf. infra).

In embodiments, the voltage buffer may be a negative-feedback amplifier. The input of the voltage buffer may then correspond to the inverting input of the negative-feedback amplifier and the output to its noninverting input. For example, the switch's first output may then be resistively coupled to a negative feedback path (i.e. to a resistively coupled output and inverting input) of the amplifier.

In the context of the transient suppression module, the switch is a switch comprising one input and (at least) two outputs. This may—in embodiments—be realized by a demultiplexer (e.g. a 1-to-2 demultiplexer), or by two simple switches (i.e. each having a single input and a single decouplable output) of which the inputs are resistively coupled. By controlling (e.g. using the controller) the switch such as to route the current received at its input to the input of the demultiplexer (i.e. through the second output), the current from the current source can be transmitted thereto without suppression. Conversely, the switch can be controlled such that the current is routed to the voltage buffer (i.e. through the first output) when the current is to be suppressed.

In embodiments, the demultiplexer having its input resistively coupled to the output of the transient suppression module (not to be confused with the—if present—demultiplexer in the transient suppression module) may be an analog demultiplexer; i.e. it may be a demultiplexer for demultiplexing an analog signal (as opposed to a digital signal).

The controller allows to both control the current suppression by the transient suppression module and the output selection of the demultiplexer. To that end, the controller may in embodiments be resistively coupled to one or more selectors of the transient suppression module (e.g. selectors of switch therein) and/or of the demultiplexer. In embodiments, the controller may comprise a first subcontroller for controlling the transient suppression module and a second subcontroller for controlling the demultiplexer. In embodiments, the (sub)controller may be a digital (sub)controller; i.e. it may control the demultiplexer and/or transient suppression module using a digital signal. In embodiments, the controller and—if present—one or more of (e.g. all) subcontrollers may be implemented by a microprocessor. With regard to the controller being 'for selecting an output of the demultiplexer and for operating the transient suppression module with respect to said output selection', the controller may typically be such that it has control over the output selection and the transient suppression module operation (e.g. whether the suppression is active or not) in such a way that it can match their order and timing to one another so as to achieve some desired operation of the stimulation circuitry as a whole. In that sense, the controller is thus typically at least suitable for operating the transient suppression module with the respect to the output selection with the aim of suppressing transient currents that occur upon said output selection (cf. supra and the third aspect).

In embodiments, the (e.g. each) circuit group may further comprise: (v) a plurality of stimulation channels, each stimulation channel comprising: (v') a capacitor having a first terminal resistively coupled to an output of the demultiplexer, and (v") a working electrode connector resistively coupled to the capacitor's first terminal.

In embodiments, the working electrode connector may be resistively coupled to the first terminal through a switch.

In embodiments, the stimulation circuitry may further comprise a digital-to-analog converter (DAC), such as a multichannel digital-to-analog converter. In embodiments, the current source may have an input (e.g. the unipolar-to-bipolar convertor's input—if present) resistively coupled to a channel of the digital-to-analog converter. In embodiments, an input of the unipolar-to-bipolar convertor may be resistively coupled to an output of the digital-to-analog converter. In some embodiments, the digital-to-analog converter may be regarded as being part of the current source. The digital-to-analog converter may advantageously be used to translate a digital signal (e.g. from the controller; cf. supra) for controlling the current source into an analog signal, allowing the current source to be accurately controlled. Alternatively, the current source may be controlled directly by the digital signal, without a typical digital-to-analog converter. This could for example be achieved by using a switch that is turned on or off by said signal (which could be regarded as a '1-bit DAC').

In embodiments, the stimulation circuitry may comprise a plurality of circuit groups. For example, the stimulation circuitry may comprise 2 or more circuit groups, preferably 4 or more, more preferably 8 or more, such 16 or more or 32 or more. In embodiments, an input of the (e.g. each) circuit group (e.g. an input of the circuit group's current source, cf. supra) may be resistively coupled to a channel of the digital-to-analog converter. The use of multiple groups advantageously allows to further scale up (i.e. beyond the demultiplexer as such) the number of channels that can be stimulated.

Illustrative embodiments of stimulation circuitry in accordance with the present invention are described in detail in the examples below (e.g. Example 1). It will be clear that any specific features of the stimulation circuitry mentioned therein need not be strictly limited to the particular context in which they are discussed, but that a person skilled in the art will be able to straightforwardly combine selected features into one or more of the above-mentioned embodiments.

In embodiments, any feature of any embodiment of the first aspect may independently be as correspondingly described for any embodiment of any of the other aspects.

In a second aspect, the present invention relates to a multichannel potentiostat, comprising the stimulation circuitry according to any embodiment of the first aspect.

The potentiostat generally has individually controllable stimulation channels; i.e. the stimulation channels can be stimulated and set independently from one another. For example, a desired target potential may be selected or determined individually/independently for each stimulation channel, while the stimulation current necessary for achieving said target potential may be applied only to the stimulation channel in question (cf. the fourth aspect); as opposed to for instance each stimulation channel being stimulated in unison and/or to the same target potential.

In embodiments, the multichannel potentiostat may further comprise a sensing circuitry. In embodiments, the sensing circuitry may be for sensing a property (e.g. a voltage) from a working electrode connector and/or a reference electrode connector. In embodiments, the working electrode connector may be coupled to a working electrode (e.g. in an electrode array). In embodiments, the reference electrode connector may be coupled to a reference electrode.

In embodiments, the sensing circuitry may comprise at least one circuit group. In embodiments, the (e.g. each) circuit group may comprise a first sensing path coupled (e.g. resistively) to the input of the demultiplexer. In alternative or complementary embodiments, the (e.g. each) circuit group may comprise a second sensing path comprising a multiplexer having a plurality of inputs resistively coupled to a working electrode connector each. In preferred embodiments, the (e.g. each) circuit group may comprise the first sensing path and the second sensing path. In embodiments, the (e.g. each) circuit group may comprise a switch for selecting between the first and second sensing path. In embodiments, the first sensing path may be resistively coupled to a first input of the switch and the second sensing path may be resistively coupled to a second input of the switch. In embodiments, the first sensing path may be coupled to the input of the demultiplexer through the transient suppression module. In embodiments, the first sensing path may be coupled to the input of the demultiplexer through the voltage buffer. This path is advantageous in that-when the channel switch is open—it allows to sense the working electrode connector's potential alongside the normal operation of the stimulation circuitry, where the demultiplexer already cycles through the different channels; it thus avoids having to operate an additional multiplexer (as for the second path) to that effect, the load of which can cause too much leakage to occur. In embodiments, the first sensing path may be resistively coupled to the output of the voltage buffer's negative feedback amplifier. In embodiments, the coupling between the plurality of second sensing path's multiplexer inputs may not go through the channel switch (cf. supra); for example the inputs may be connected to the working electrode connector each. The second sensing path is thus typically coupled more directly to the working electrode connectors and for example allows to bypass the channel switch. This path is therefore advantageous when the channel switch is open (e.g. while precharging the channel capacitor), so that the working electrode connector is decoupled from the demultiplexer.

In embodiments, the sensing circuitry may comprise an analog-to-digital converter (ADC). In embodiments, the first and/or second sensing path (e.g. an output of the switch) may be coupled (e.g. resistively) to an input of the analog-to-digital converter. In embodiments, the (e.g. each) circuit group may further comprise an anti-aliasing filter (e.g. a first order pseudo differential low-pass filter). In embodiments, the first and/or second sensing path (e.g. the output of the switch) may be coupled to the input of the analog-to-digital converter through the anti-aliasing filter. The anti-aliasing filter may advantageously be used to avoid aliasing when converting signals from the analog to digital domain.

In embodiments, the multichannel potentiostat may have stimulation channels (e.g. at least partially comprised in the stimulation circuitry) and sensing channels (e.g. at least partially comprised in the sensing circuitry). In embodiments, the number of stimulation channels may be at least 30% of the number of sensing channels, preferably at least 40%, more preferably at least 50%, such as at least 60%, 70%, 80%, 90% or 100%. In embodiments, the multichannel potentiostat may comprise at least 25 stimulation channels, preferably at least 50, more preferably at least 100; such as at least 32, preferably at least 64, more preferably at least 128. For example, the multichannel potentiostat may comprise 8 groups (e.g. each coupled to a common 8-channel DAC), each group comprising 16 channels (e.g. each coupled to a common 1-to-16 demultiplexer per group); for a total of 128 channels. Even more channels may obviously be achieved by increasing the number of groups (e.g. using a 16-channel DAC) and/or the number channels per group (e.g. using 1-to-32 demultiplexers) Due to manufacturing errors, the multichannel potentiostat may comprise some channels (e.g. stimulation and/or sensing channels) which are non-functional.

Illustrative embodiments of potentiostats in accordance with the present invention are described in detail in the examples below (e.g. Example 1). It will be clear that any specific features of the potentiostats mentioned therein need not be strictly limited to the particular context in which they are discussed, but that a person skilled in the art will be able to straightforwardly combine selected features into one or more of the above-mentioned embodiments.

In embodiments, any feature of any embodiment of the second aspect may independently be as correspondingly described for any embodiment of any of the other aspects.

In a third aspect, the present invention relates to a method for operating a stimulation circuitry as defined in any embodiment of the first aspect, comprising using the controller to select an output of the demultiplexer while suppressing a transient current with respect to the output of the transient suppression module.

In embodiments, the method may comprise: (a) suppressing the current out of the current source (e.g. by operating the transient suppression module thereto), (b) selecting the output of the demultiplexer (e.g. switching to a different output), (c) stabilizing the current on a potential of the selected output (e.g. letting transient current subside), and (d) routing the stabilized current to the demultiplexer's input.

Illustrative embodiments of the present method are described in detail in the examples below (e.g. Example 1). It will be clear that any specific features of said methods mentioned therein need not be strictly limited to the particular context in which they are discussed, but that a person skilled in the art will be able to straightforwardly combine selected features into one or more of the above-mentioned embodiments.

In embodiments, any feature of any embodiment of the third aspect may independently be as correspondingly described for any embodiment of any of the other aspects.

In a fourth aspect, the present invention relates to a method for operating a multichannel potentiostat as defined in any embodiment of the second aspect, comprising the method according to any embodiment of the third aspect and further comprising: (a) determining a potential of a sensing channel associated with a working electrode connector, and (b) setting—in function of the determined potential—a stimulation current for achieving a predetermined target potential for a stimulation channel associated with the same working electrode connector.

In embodiments, step a may comprise sensing the voltage of a working electrode connector (i.e. of the sensing channel). In embodiments, step a may comprise calculating the potential of the sensing channel with respect to a reference voltage. For example, the voltage of the working electrode connector and of a reference electrode connector may be sensed and the sensing channel potential may be calculated therefrom (e.g. as the difference between the former and the latter).

In embodiments, step b may comprise calculating an error signal between the determined potential and the predetermined target potential and deriving therefrom the stimulation current to be set.

In embodiments, calculating the potential in step a, and/or calculating the error signal and deriving therefrom the stimulation current to be set in step b, may be performed using a digital LQI (Linear Quadratic with Integral) controller.

In embodiments, the method may comprise compensating for channel-to-channel crosstalk (cf. infra).

In embodiments, the method may comprise calibrating (e.g. digitally) the stimulation current. The calibration may for example be used to account for nonidealities of the current output by the current source and possible disturbances in the load voltage (cf. infra). In embodiments, the method may comprise calibrating (e.g. digitally) the sensed voltage (cf. infra).

Illustrative embodiments of the present method are described in detail in the examples below. It will be clear that any specific features of said methods mentioned therein need not be strictly limited to the particular context in which they are discussed, but that a person skilled in the art will be able to straightforwardly combine selected features into one or more of the above-mentioned embodiments.

In embodiments, any feature of any embodiment of the fourth aspect may independently be as correspondingly described for any embodiment of any of the other aspects.

In a fifth aspect, the present invention relates to a use of a transient suppression module, being a module for controllably suppressing a transient current with respect to an output of said transient suppression module, for reducing a minimum current pulse time needed to achieve a predetermined delivered charge accuracy in a stimulation circuitry for a multichannel potentiostat.

In embodiments, the use may further be for reducing a voltage ripple (cf. supra and Example 1). In embodiments, the use may further be for—for a certain acceptable voltage ripple increase the number of demultiplexer outputs (e.g. channels) that can be stimulated by a single current source in a given time frame.

In embodiments, any feature of any embodiment of the fifth aspect may independently be as correspondingly described for any embodiment of any of the other aspects.

In a sixth aspect, the present invention relates to a use of a multichannel potentiostat as defined in any embodiment of the second aspect for concurrently performing a plurality of electrochemical measurements in parallel, preferably bioelectrochemical measurements.

'Bioelectrochemical measurement' is to be interpreted in a broad sense. For example, it can refer to the measurement of whole microorganisms (e.g. microbial electrochemical measurements) or biological molecules including enzymes, proteins in general, ribonucleic acids or other biological materials as known to a person skilled in the art. Moreover, it can also relate to the oxidation/reduction of molecules that can transport electrons to and from microorganisms and biological materials.

In embodiments, the plurality electrochemical measurements in parallel may comprise a plurality of the same electrochemical measurements, a plurality of different electrochemical measurements (e.g. each executed at a different working electrode voltage) or a combination thereof (e.g. different sets of replicates). For example, for an n-channel potentiostat, n replicates of the same electrochemical measurement can be concurrently performed in parallel (e.g. setting equal voltages for all channel), thereby advantageously obtaining measurement results with an elevated statistical significance in the same time as performing the measurement once. Alternatively, n different electrochemical measurements can be performed in parallel, such as chronoamperometry measurements using n different voltage steps or voltammetry measurements at n different working electrode voltages (e.g. to therefrom construct a graph comparable to a cyclic voltammogram). Or, both approaches can be combined by performing m sets of different electrochemical measurements (with each set for example comprising n/m replicates). Regardless of the approach taken, the corresponding measurement results are advantageously obtained in an n times smaller time compared to performing the same amount of measurements in series. The observed benefits are therefore typically most pronounced for experiments which are inherently rather lengthy, such as the aforementioned chronoamperometry or as an alternative to cyclic voltammetry (CV) measurements with a relatively slow (e.g. in the order of $1$ mV$\cdot$s$^{-1}$ or lower) scan rate; these are illustrated in Example 1.V. Likewise, the observed benefits are typically also larger when the subject-to-be measured requires longer measurements, such as is commonly the case in corrosion studies and bioelectrochemical measurements (e.g. when applied to microorganisms); the latter is also illustrated in detail in Example 2. Other examples may include: (i) assessing and studying the electroactivity of axenic cultures across a range of potentials (e.g. simultaneously for both anodic and cathodic reactions); (ii) screening for electroactive bacteria in microbial communities across a range of potentials; (iii) studying the impact of electroactive bacteria on biocorrosion (e.g. using electrodes having a surface of a corrodible metal); (iv) assessing the optimal electric signal (e.g. electrochemical potential) to grow electroactive biofilms and maximize their current density (e.g. for application such as microbial fuel cells, microbial electrolysis cells, microbial electrosynthesis or microbial electrochemical sensors); (v) studying enzyme electrochemistry (even if such experiments with enzymes tend to generally be much faster than with microorganisms).

The present use is moreover particularly beneficial as an alternative to a slow cyclic voltammetry measurement as commonly used to e.g. assess the polarization curve of an electrochemical electrode. Ideally, such a polarization curve should be obtained by successively applying different potentials and recording the obtained current; each for a very prolonged period, so to have a steady-state condition. In practice, this is approximated using a slow cyclic voltammetry with a very slow voltage ramp (e.g. in the order of $1$ mV$\cdot$s$^{-1}$ or lower); rather than the ideally required stair-case voltage. However, using the multichannel potentiostat in accordance with the present invention, the measurement can be truly performed as ideal, by simultaneously applying a different potential for each channel and sensing under steady-state conditions. Such parallel measurements are moreover faster than the established slow CV technique (cf. supra). An example of this procedure is illustrated in Example 1.V (e.g. with respect to FIG. 32).

In embodiments, the use may furthermore be combined with machine learning to adjust the experiment parameters during operation. For example, the results from parallel measurements may be used in combination with a performance metric to tune the experiment parameters towards some goal (e.g. maximize growth in a bioelectrochemical study or minimizing start-up time).

In embodiments, any feature of any embodiment of the sixth aspect may independently be as correspondingly described for any embodiment of any of the other aspects.

The invention will now be described by a detailed description of several embodiments of the invention. It is clear that other embodiments of the invention can be configured according to the knowledge of the person skilled in the art without departing from the true technical teaching of the invention, the invention being limited only by the terms of the appended claims.

Example 1: A Scalable 128-Channel, Time-Multiplexed Potentiostat for Parallel Electrochemical Experiments The present example describes a further evolution of the 128-channel potentiostat by Molderez et al. (2020) (cf. supra).

I. Scalable, Parallel Potentiostat Architecture Using Time Division Multiplexing To increase the number of parallel channels for a multi-channel potentiostat, a time division multiplexing architecture was used, as described I.A. The essential components are: a storage capacitor (I.B), a fast current source (I.C), and an individual potential controller (I.D). Taking into account the constraints of these components, I.E then defines the scalable, parallel potentiostat topology. In this respect, the target specifications for a single channel can be formulated as: a potential range from ±1 mV to ±5 V, a current range from ±1 nA to ±1 µA and a bandwidth above 10 Hz.

A. Time Division Multiplexing Architectures

The relaxed bandwidth requirements for time-consuming electrochemical experiments like constant chronoamperometry or cyclic voltammetry (CV) with scan rates in the order of 1 mV·s$^{-1}$ or lower, and the observation that modern electronics easily operate in the MHz order make it possible to share a fast controller for multiple channels using time division multiplexing. However, disconnecting the controller from one channel results in a sudden halt of the electrochemical reaction as the electrical loop is broken, which is unwanted. A channel thus needs a proper electrical storage unit, either a capacitor or an inductor, to provide electrical current while the controller is temporally disconnected. The storage unit should be as small as possible as each channel requires an individual one.

To determine whether a capacitor or inductor is more appropriate for temporal energy storage, the following assumptions are used. The controller is shared across n channels. Each channel is successively stimulated for time $T_{on}$, which automatically results in a temporal disconnection time of $T_{off}=(n-1)T_{on}$, to be able to stimulate the other n−1 channels. The load consumes a constant, positive current $I_L$ at a constant, positive voltage $V_L$ with a small-signal resistance $R_{ss}$, which is in our application in the order of 1 MΩ. If a capacitor with capacitance C is used for temporal energy storage, the load voltage will drop over time $T_{off}$ because of charge consumption with ΔV, the voltage ripple. This voltage ripple corresponds with an equivalent consumed electrical energy $E_C$ during $T_{off}$ $$E_C = I_L V_L T_{off} = \frac{1}{2}C\Delta V^2. \tag{1}$$

On the other hand, if an inductor with inductance L is used for temporal energy storage, the load current will drop over time $T_{off}$ because of magnetic flux consumption with ΔI.

Again, this current ripple corresponds with a consumed electrical energy $E_C$ during $T_{off}$:

$$E_L = I_L V_L T_{off} = \frac{1}{2}L\Delta I^2. \tag{2}$$

As the consumed energy is only dependent on the load, $E_C=E_L$. Furthermore, the voltage ripple and current ripple are related by the load small-signal resistance $R_{ss}$. Combining this with eq. (1) and eq. (2) relates C with L:

$$L = CR_{ss}^2. \tag{3}$$

Thus, for an equal ripple voltage, the required storage inductance is a factor $R_{ss}^2$ larger than the storage capacitance. Given that the capacitance volume density is larger than the inductance volume density, using a capacitor as storage element will result in a much lower channel area.

The driver circuitry of the time-shared potentiostat controller can be implemented with either a controllable voltage source (FIG. 4) or a controllable current source (FIG. 5). A controllable current source has three advantages in comparison with a controllable voltage source. First, there exists a direct relationship between the charge current $I_c$ of the shared controllable current source and the continuous load current $I_L$ given by the ratio between the on-time $T_{on}$ and the off-time $T_{off}$:

$$I_L = \frac{T_{on}}{T_{on} + T_{off}}I_c = \frac{I_c}{n}. \tag{4}$$

This relation makes it straightforward to determine the load current from the driving current. Second, the transient behaviour of recharging the channel storage capacitor with a controllable current source is well defined with a constant recharge current and a linear increase of the capacitor voltage (FIG. 7). The transient behaviour of recharging the channel storage capacitor with a controllable voltage source on the other hand is not well defined, with an exponential current decay dependent on the unknown, parasitic switch resistance (FIG. 6). To accurately measure the charge current, a dedicated current measurement circuitry would be required with a higher sampling frequency than the switching ratio $1/T_{on}$. Third, the acceptable voltage ripple ΔV limits the time-sharing ratio n. For a controllable current source, this trade-off is expressed by:

$$\Delta V = \frac{(n-1)T_{on}I_L}{C}, \tag{5}$$

which results in different design freedoms. For a controllable voltage source, due the finite on-resistance ($R_M \approx 100\Omega$) of the analog multiplexer, $T_{on}$ has a lower limit of $\tau=5R_MC\approx500$ C. As a result, eq. (5) simplifies to:

$$\Delta V = 500(n-1)I_L. \tag{6}$$

In this case, the only remaining design freedom is $I_L$. The largest drawback of a controllable current source is a more complex circuit architecture in comparison with a controllable voltage source.

From this analysis follows that the optimal time-shared potentiostat topology consists of a single potential controller with a single controllable current pump driver for all channels. Each of these channels has a dedicated storage capacitor to temporally store the charge to make sure the electrochemical reaction continuous when the electrode is not connected to the shared controller.

B. Low-Leakage Storage Capacitor

Figures 8, 9, 10, 11:
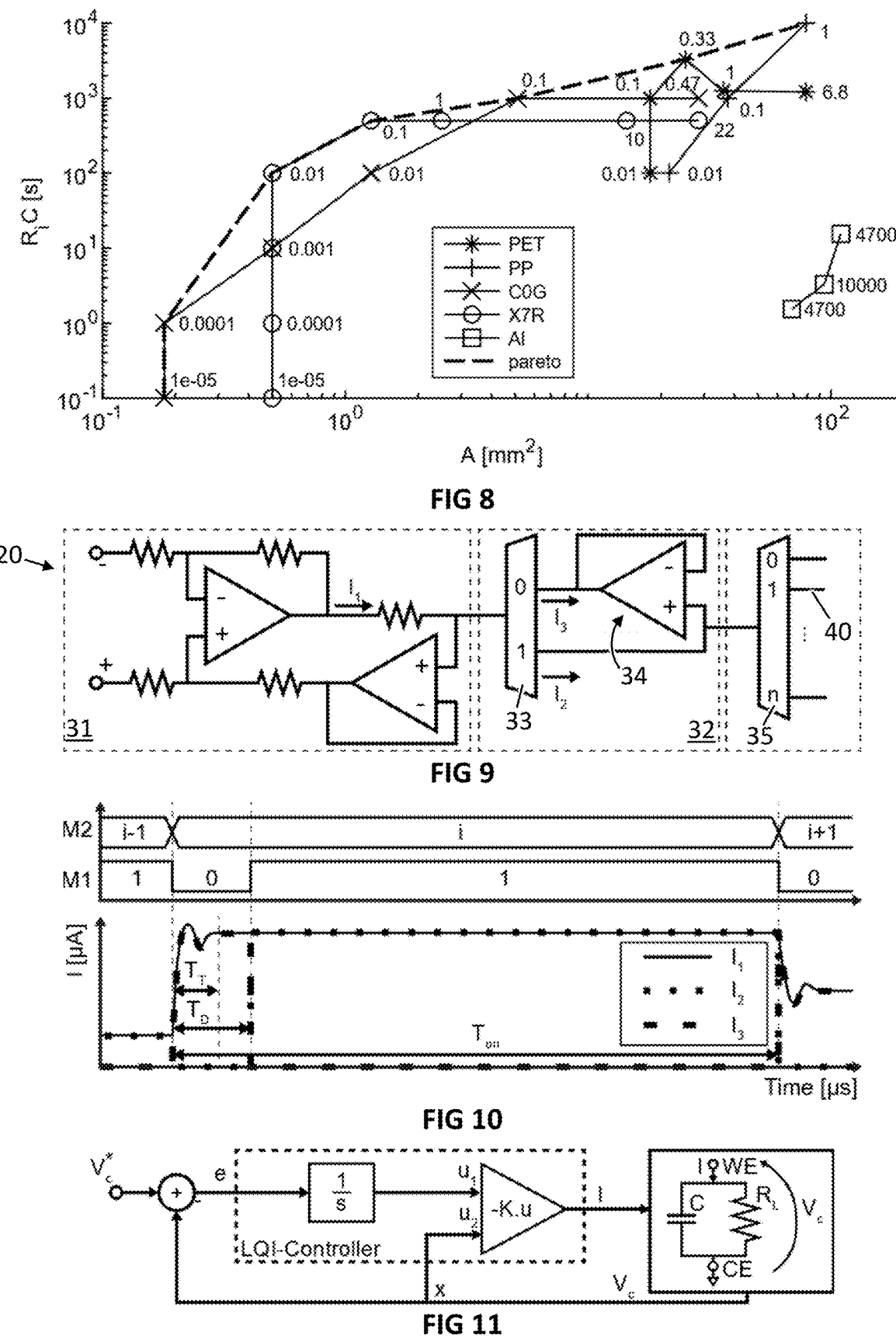
FIG. 8 is a Pareto curve of the trade-off between the area of a capacitor and the performance metric RiC, with Ri upper bounded by 10 GΩ due to the leakage of commercial off-the-shelf (COTS) components. The capacitance is indicated in μF for each sample.
FIG. 9 is a schematic representation of the circuit architecture of a digital enhanced current source (30) in accordance with the present invention, comprising a modified Howland current pump (31), a digital transient suppression module (32) comprising a multiplexer (33) and a negative-feedback amplifier as voltage buffer (34), and an analog multiplexer (35) to the various stimulation channels (40).
FIG. 10 is a graph showing the signal waveforms (bottom) for the digital enhanced current source of FIG. 9 of the currents $I_1$, $I_2$ and $I_3$ (as indicated in FIG. 9) in function of—in operation-switching the channels of multiplexers M1 (i.e. multiplexer 33) and M2 (i.e. multiplexer 35) as shown (top).
FIG. 11 is a schematic representation of an LQI-controller with a linearized, simplified Randles Cell as load.

The particular capacitance influences the $I_L/C$ ratio of eq. (5) which should be minimized to minimize the voltage ripple. As $I_{max} \propto l_{min}$ and $I_{min} \propto R_i^{-1}$, where $R_i$ is the insulation resistance of the capacitance, this is equivalent to maximizing the product $R_iC$. Due to the leakage of COTS components, which is in the order of $\approx 10 \ldots 100$ pA, $R_iC$ has a practical upper bound of 10 GΩ for our application. FIG. 8 compares the RiC ratio with the area for different capacitance values for different capacitance technologies and indicates the Pareto front.

C. A Digital Enhanced Current Source

The on-time $T_{on}$ of the time-shared control should be minimized to maximize the time-share ratio for a given tolerable ripple voltage (eq. (4)). Yet, reducing the on-time negatively impacts the current accuracy. A real current source does not produce a square pulse yet produces a pulse with an unknown transient response before and after the pulse. The total delivered charge for a single period thus varies between $$Q_L = I_L^* n T_{on} \pm 2 I_L^* n T_T, \tag{7}$$

where $$I_L^*$$

is the nominal load current and $T_T$ is the unknown transient time of the current source. The average load current then becomes:

$$I_L = I_L^* \pm \frac{2T_T}{T_{on}} \tag{8}$$

and is affected by the finite transient time ($T_T \approx 4$ μs). To reduce the signal transient time in comparison with Molderez et al. (2020) (cf. supra), FIG. 9 shows the circuit architecture of an improved current source (20) using a transient suppression module (32) comprising a voltage buffer (34) in the form of an additional amplifier (opamp) and an analog multiplexer as switch (33). The resulting signal waveform is shown in FIG. 10. The unknown transient current $I_3$ of the current source is absorbed by the voltage buffer (34). After the delay $T_D$ with $T_D \geq T_T$, the output of the current source is stable and is connected to the channel capacitance. While the transient of the current source remains the same, the signal transient time is reduced to $T_M \approx 100$ ns, the switching time of the analog multiplexer. For a target relative precision of r=1%, $$T_{on} \geq T_M r^{-1} + T_T = 14 \text{ μs}, \tag{9}$$

instead of $T_{on} \geq T_T r^{-1} = 400$ μs of the current source in Molderez et al. (2020). In other words: by using the transient suppression module in accordance with the present invention, the signal transient time becomes the switching time $T_M$ of the switch instead of the transient time of the current source $T_T$, thereby greatly reducing the minimum on-time $T_{on}$ to achieve a desired target relative precision r (cf. eq. (9)).

D. Individual Potential Control with a Digital LQI Controller

While the stimulation and sensing circuitry of each channel is time-shared, an individual potential controller is still required. In the present example, the potential control is done in the digital domain. As such, a single hardware unit, a microcontroller, is able to execute multiple, individual controllers using round robin scheduling. A digital LQI controller, shown in FIG. 11, is used for each channel. The Randles Cell is used as load to optimally tune the controller parameters.

For a high-performance microcontroller (200 MOPS), the execution time of such a single LQI controller is about 10 μs, taking into account the practical overhead (discussed further on in section V).

E. The Time-Share Ratio

The time-share ratio is set at n=16, a practical constraint due to the maximum amount of channels of COTS analog multiplexers. The $T_{on}$'$_2$ 96 μs, well above the lower bound of (eq. 9), due to the execution speed of the LQI-controller. For the target specification's current range of form ±1 nA to ±1 μA, $R_iC > 3000$ which results in a PET 0.33 μF storage capacitor (FIG. 8). The theoretical voltage ripple then becomes in worst case, at maximal current load, $\Delta V = 4$ mV.

The combined drive and sensing circuitry with 16× multiplexed channels, i.e. a "group", is duplicated 8× with a single, shared mixed-signal and digital control resulting in a 128-channel potentiostat.

II. PCB Hardware Implementation

Figure 12:
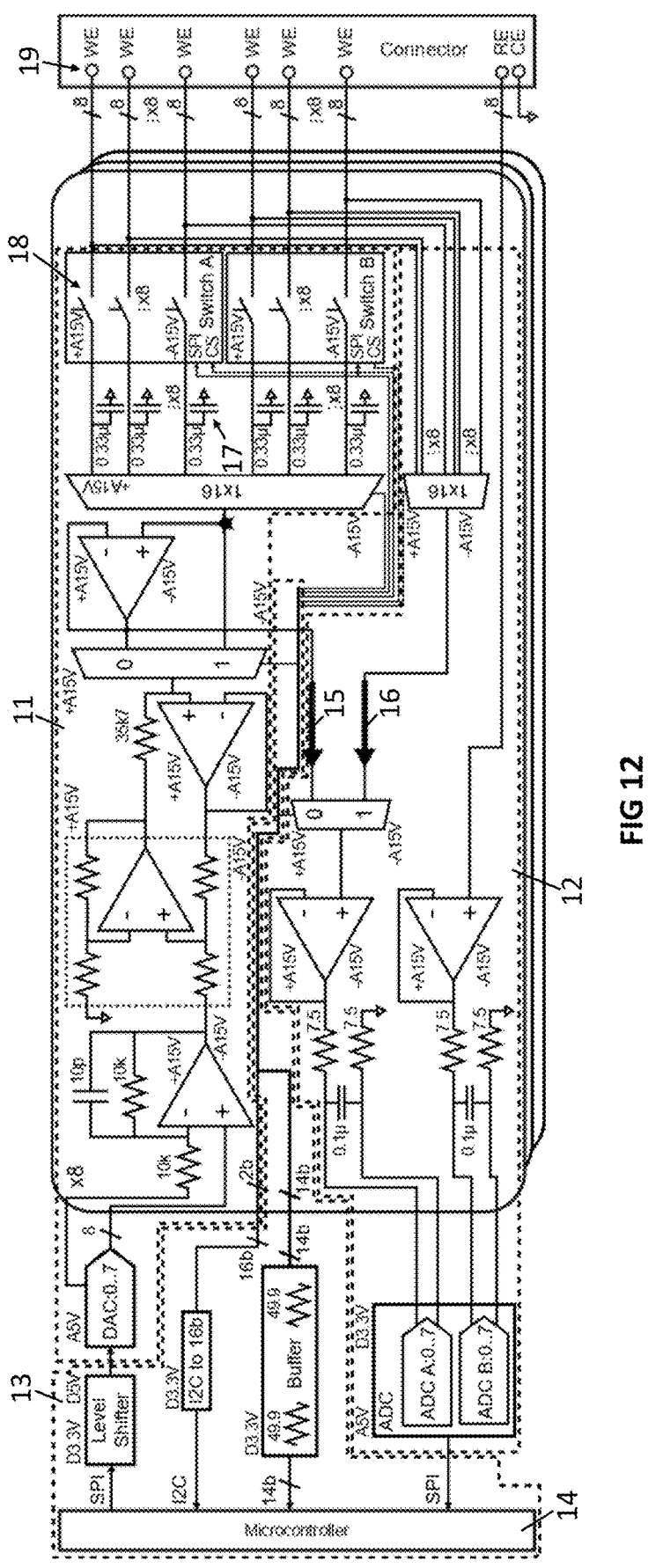
FIG. 12 is a schematic representation of an analog and mixed-signal system architecture of a multichannel potentiostat in accordance with the present invention, with the stimulation circuitry (11), the sensing circuitry (12), and the auxiliary circuitry (13).

The time-multiplexed channel architecture is implemented with COTS components and PCB technology. FIG. 12 gives an overview of the hardware with the stimulation circuitry, the sensing circuitry and the microcontroller.

The stimulation circuitry (11) is responsible of sourcing or sinking current from the storage capacitors to maintain the channel potential. The circuitry consists of a 8-channel DAC (DAC8568, TI) together with 8 equal digital enhanced current sources, consisting of an unipolar-to-bipolar low-pass filter, a Howland current pump (INA105, TI) and the digital transient compensation with an analog multiplexer (ADG1221, AD) and an absorbing opamp (OPAx192, TI). Each of the current sources is connected to a 16-channel analog multiplexer and 16 storage capacitors (MKS2, WIMA). Each channel contains an individual switch to enable or disable a channel. (MAX335, MI).

The sensing circuitry (12) contains 8 parallel blocks to measure the voltage of one WE and of one RE out of a set of 16-channels each to be able to digitally calculate the potential of the WE. There are two paths to measure the WE voltage. During normal operation, the WE voltage is measured from path 15. However, during start-up, the storage capacitors behave as an unwanted short-circuit to the load. They are therefore pre-charged while the channel switch is closed. The voltage is then measured using path 16. Both the WE voltage and RE voltage are anti-aliased filtered with a first order pseudo differential low-pass filter. A 16-channel ADC digitizes the signals (AD7616, AD).

Figures 13, 14, 15:
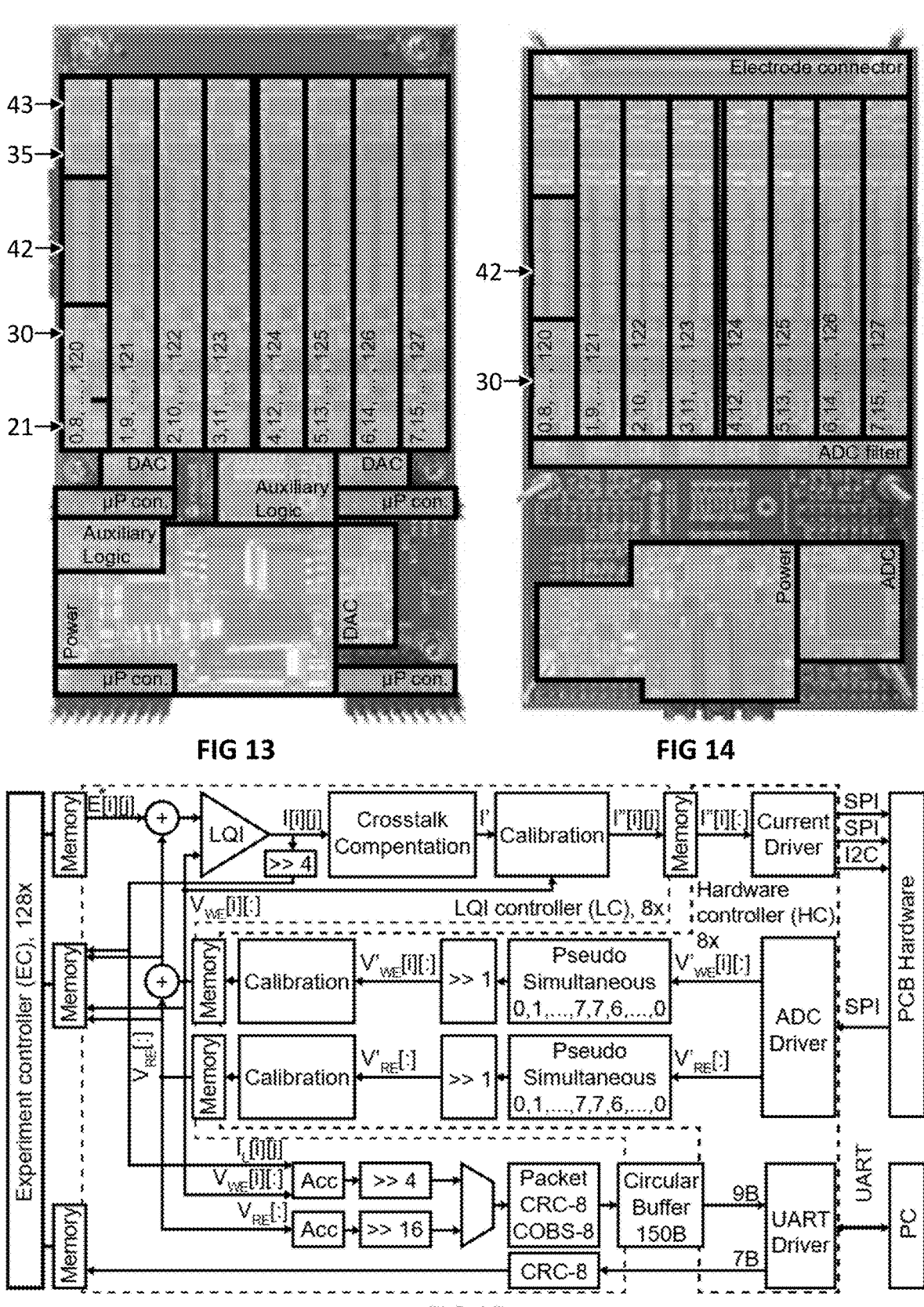
FIG. 13 and FIG. 14 are photographs of respectively the front and back view of a 128-channel potentiostat PCB in accordance with the present invention. Each of the 8 groups contains 16 channels with the antialiasing filter (21), the digital enhanced current source (30), the low-leakage channel capacitors (42) and the analog multiplexers (35) and switches (43).
FIG. 15 is a schematic representation of the software architecture with the experiment controller (EC), the LQI controller (LC) with crosstalk compensation and current calibration and the hardware controller (HC) with voltage calibration.

Photographs of the front and back view of a 128-channel potentiostat on a PCB are respectively shown in FIG. 13 and FIG. 14. The PCB contains 8 layers: a top routing layer, a ground plane, a first inner routing layer, a ground plane, a power plane, a second inner routing layer, a power plane and a bottom routing plane. Each of the 8 groups contains 16 channels with the antialiasing filter (A), the digital enhanced current source (B), the low-leakage channel capacitors (C) and the analog channel multiplexers and switches (D). The total board area is $1.6 \times 104$ mm² of which $1.2 \times 104$ mm² is functional area and $4 \times 103$ mm² is support area (power supply, connector to the microcontroller and connector to the external working electrodes). The microcontroller is a dual-core (only 1 core is used) Delfino F28379D from TI, tailored for digital closed-loop operations with 200 MOPS for each core. This results in an area-per-channel of 93 mm². The total component cost (for 10 production units) is about $600 ($85 for the PCB, $475 for the electronic components and $40 for the microcontroller) resulting in a cost-per-channel of $4.7.

III. Software Implementation

The software control of the time-multiplexed architecture consists of three nested controllers, the channel-to-channel crosstalk compensation and the online digital calibration for the 8 groups [j] of 16 channels [i] each (FIG. 15).

A. The Digital Control Software

The hardware controller (HC) is responsible for the low-level control of the current stimulation and voltage sensing hardware. The HC stimulates 8 channels simultaneously with a specific current I[i][•] determined by the LQI controller (LC) in 48 successive steps (s0, s1, . . . , s47), each lasting 2 µs (in total 96 µs, FIG. 16). At the same time, the HC reads the sampled voltage of the 8 WE and the 8 RE in a pseudo-simultaneous order. Both the stimulated current and measured voltage are sent to an external pc using UART.

The LC is responsible for the digital potential control of each channel. The channel potential is calculated from the measured channel voltage and the reference voltage. Each of the 8 REs can be used as reference for any of the 128 WEs. The LQI unit calculates the error signal between the measured potential E[i][j] and the target potential E*[i][j] and derives a corresponding stimulation current I[i][j]. Each LQI controller contains protection for integral windup. Furthermore, the channel current and voltage data are down sampled and packaged. The LC processes 8 channels in a single round of 96 µs and runs 8 channels before the HC (FIG. 16).

The experiment controller (EC) is responsible for electrochemical measurement experiments. This controller runs a specific experiment for all 128-channels at 651 Hz and determines the next target potential E*[i][j] of the LC for all channels (FIG. 16). Chronoamperometry and CV are implemented in the present example.

Figures 16, 17, 18, 19, 20:
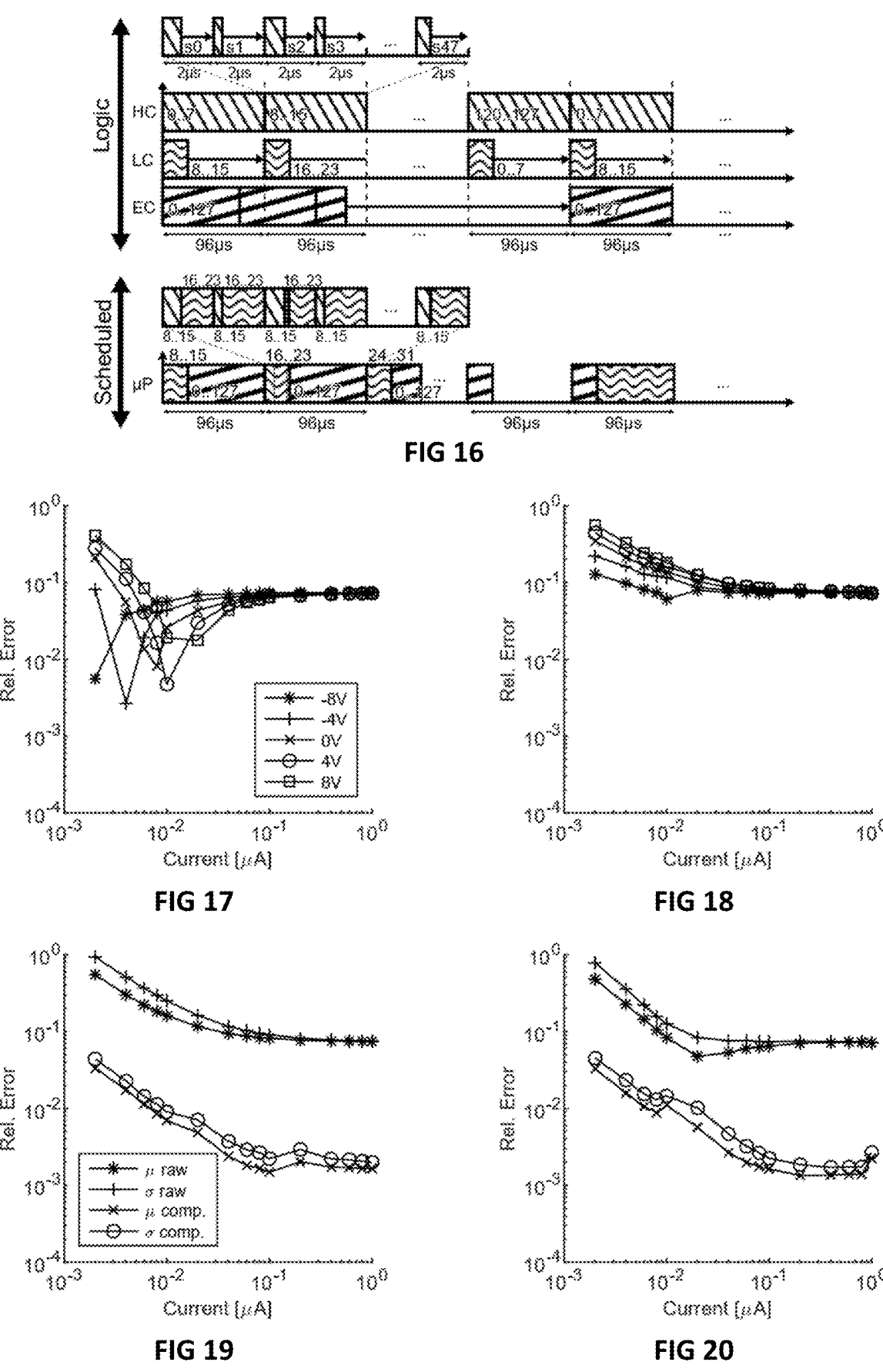
FIG. 16 is a schematic representation of the logic ordering with the hard real-time deadlines (top) and scheduling (bottom) of the three different controllers (HC, LC and EC) and the microprocessor (μP).
FIG. 17 and FIG. 18 are graphs of the raw relative current error and impact of the load voltage for a single channel for respectively a negative current and a positive current.
FIG. 19 and FIG. 20 are graphs of the compensated relative current error (μ and σ) for all load voltages for respectively a negative current and a positive current.
Figure 21:
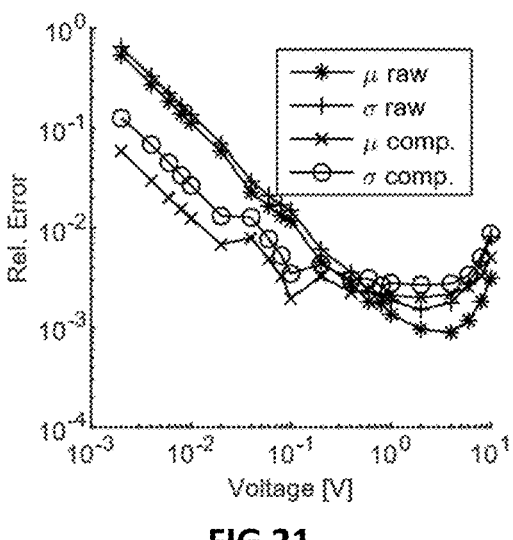
FIG. 21 and FIG. 22 are graphs comparing the relative voltage error (μ and σ) for uncompensated and compensated channels for respectively negative voltages and positive voltages.
Figure 22:
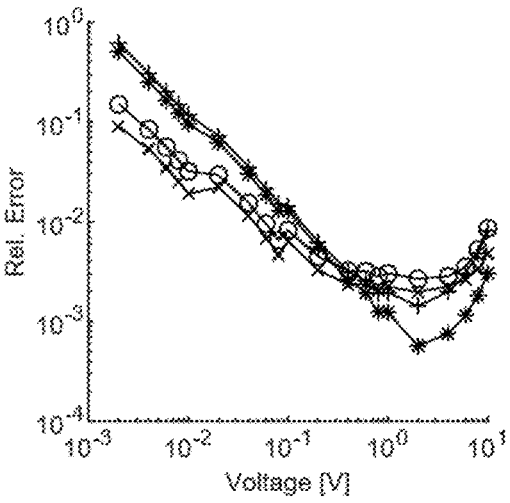
Figure 23:
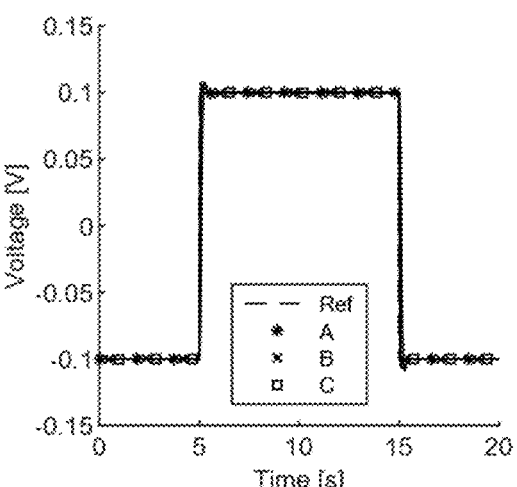
FIG. 23 and FIG. 24 are graphs showing the small signal step response for different LQI settings (A-C, compared to a reference) for respectively the voltage and the current.
Figure 24:
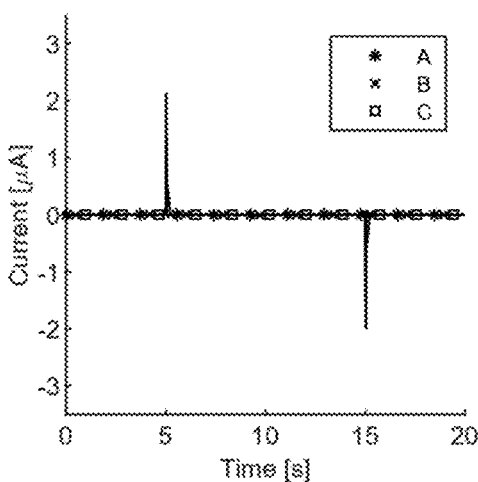
Figure 25:
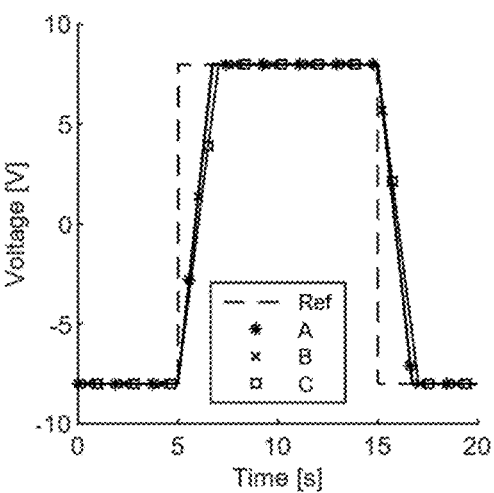
FIG. 25 and FIG. 26 are graphs showing the large step response for different LQI settings (A-C, compared to a reference) for respectively the voltage and the current.
Figure 26:
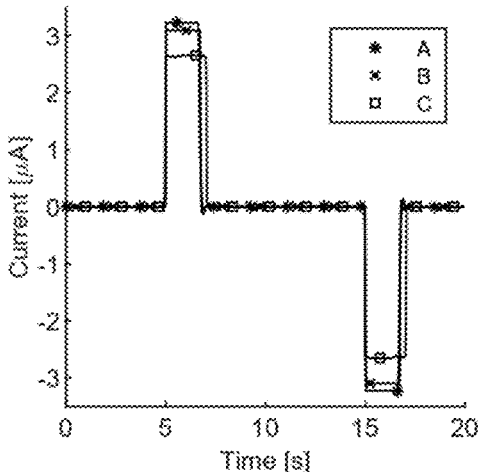

A single, hierarchical interrupt at 2 µs is used to schedule each controller (FIG. 16). In this way, accurate timing is available for the HC without the need of manually scheduling the LC and EC controllers, which have longer hard real-time deadlines.

B. Channel-to-Channel Crosstalk Compensation

The small parasitic common node capacitance $C_p[j]$ (star in FIG. 12), in the order of a 1 pF, causes a voltage dependent channel-to-channel cross-talk. When switching from channel i−1 to channel i, the voltage of the common node $V_p[j]$ goes from V[i−1][j] to V[i][j] causing a parasitic charge redistribution. The common node voltage $V_p[j]$ equals after switching to the next channel, for $C_p[j]$ and $C_c$ (i.e. the capacitance of capacitor 17) in parallel:

$$V_p[j] = \frac{C_p[j]V[i-1][j] + C_c V[i][j]}{C_p[j] + C_c} \approx V[i], C_c \gg C_p[j]. \quad (10)$$

The charge of the parasitic capacitance changes from $C_p[j]$ V[i−1][j] to $C_c$V[i][j]. Thus, a parasitic charge $\Delta Q_p[i][j]$ flows to $C_c$ equaling $$\Delta Q_p[i][j] = C_p[j](V[i-1] - V[i]). \quad (11)$$

The charge current I[i][j] from the LC is digitally corrected by the crosstalk compensation block (FIG. 15), before given to the digital calibration block, knowing the voltage of the previous channel:

$$I'[i][j] = I[i][j] - \frac{C_p[j](V[i-1][j] - V[i][j])}{T_{on}}. \quad (12)$$

In eq. (12), $C_p[j]$ is unknown and also channel (i) dependent. For each channel, this parameter is empirically determined by sweeping V[i][j]=−8, −2, . . . , 8 V, V[i−1][j]=−8, −2, . . . , 8 V and recording I[i][j] for an infinite load. From the measured current, $C_p[i][j]$ is derived.

C. Online Real-Time Digital Calibration

The calibration block for current stimulation and voltage sensing (FIG. 15) corrects the offset and gain error of the analog circuitry. For the current stimulation, an individual static quadratic least-square model is used for each of the 128 channels to take into account nonidealities of $I_{out}$, the output of the controllable current source, and possible disturbances of the load voltage $V_{out}$:

$$I_{out} = A + BI_{in} + CV_{out} + DI_{in}V_{out} \quad (13)$$

where $I_{in}$ the input of the channel current source and A, B, C and D are fitting parameters. The inverse of eq. (13), $$I''[i][j] = \frac{I'[i][j] - A[i][j] - C[i][j]V[i][j]}{B[i][j] + D[i][j]V[i][j]} + D[i][j]V[i][j], \quad (14)$$

is used for each channel to predistort the input current I''[i][j] to have the output current equal to the target current. The fitting parameters are empirically determined for each channel using an automated calibration measurement setup. For each channel, V[i][j] is swept between −8, −2, . . . , 8 V and I[i][j] is swept between (0±2, ±4, . . . , ±10)*(1, 10, 100 nA). This calibration experiment is run twice: first without pre-compensation to fit the parameters and second with precompensation by eq. (14) to verify the accuracy of the compensated output.

For the voltage sensing, an individual static linear first-order model is used for each of the 128 channels:

$$V_{out} = E + FV_{in} \qquad (15)$$

where $V_{in}$ is the actual channel voltage, $V_{out}$ the sensed channel output voltage and E and F are fitting parameters. The inverse of eq. (15), $$V[i][j] = \frac{V'[i][j] - E[i][j]}{F[i][j]}, \qquad (16)$$

is used for each channel to calculate the actual input voltage V[i][j] from the measured voltage V'[i][j]. These fitting parameters are again empirically determined for each channel. In this case, VI[i][j] of each channel is swept between −8, −2, . . . , 8 V, again first for fitting and second for verification of the calibration by eq. (16).

IV. Electronic Measurement Results

The 128-channel potentiostat is first electronically characterized, for its DC performance, AC performance, channel-to-channel crosstalk, and steady-state voltage ripple.

The DC measurements are first discussed. FIG. 17 and FIG. 18 show the impact of the load voltage on the raw current accuracy for a particular channel. The strong impact of the voltage on the relative accuracy motivates the use of digital calibration. The relative error improves with a factor 10 after calibration to at least 1% overall except for the lowest current range 1 . . . 10 nA (FIG. 19 and FIG. 20). The current channel-to-channel mismatch is <1.2% for I≤10 nA and <0.1% for I>10 nA. The average relative voltage accuracy is <10%<10% for V≤10 mV and <1% for V>10 mV. The channel-to-channel mismatch is <7% for V≤10 mV and <1% for V>10 mV.

Figure 27:
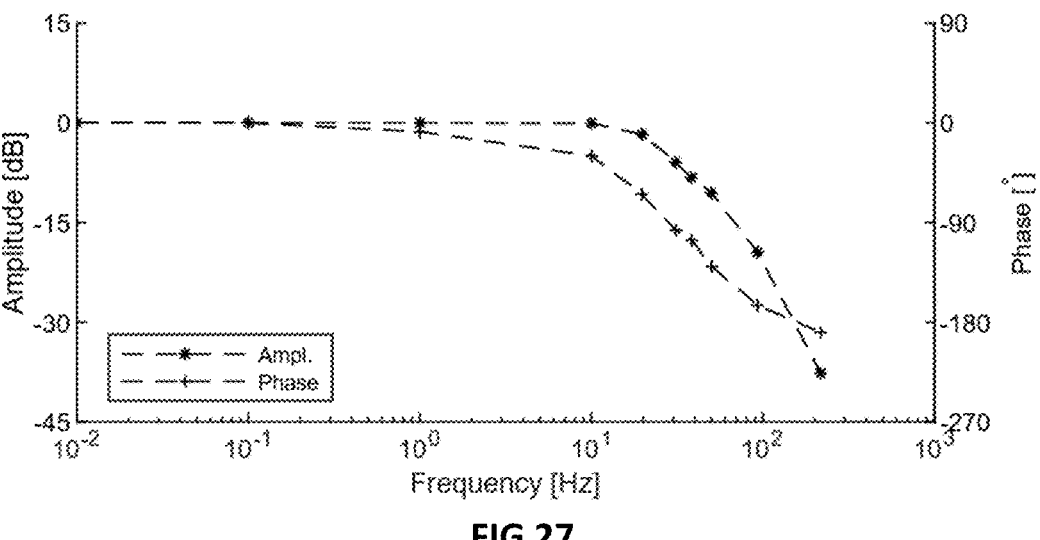
FIG. 27 is a graph of the transfer function of a single channel.

Next, the AC measurements are discussed. FIG. 23-FIG. 26 show the current and voltage step response of a particular channel for a small step (200 mV) and a large step (16 V) for three different LQI parameters with A the most aggressive and C the least aggressive. The response is very linear for the small step with a faster response (and slightly more overshoot) for the more aggressive controller settings, which is expected. The response is non-linear for the large step, with saturation of the current driver and corresponding anti integral windup limiting the output. Again, no overshoot is visible which could trigger unwanted electrochemical reactions. The transfer function of a single potentiostat channel is shown in FIG. 27. The channel bandwidth is about 20 Hz which is sufficient for most time-consuming electrochemical experiments, but may not be for faster dynamic experiments.

The calculated voltage ripple at 651 Hz according to eq. (5) is compared with the practical output ripple for different load currents in FIG. 28. The difference between the calculated ripple and the measured ripple is minimal. At a nominal load current of 1 μA, the ripple is about 4 mV, which is a 5× improvement in comparison with Molderez (2020) and close to the typical 1 mV potential control resolution of commercial instruments.

Figure 28:
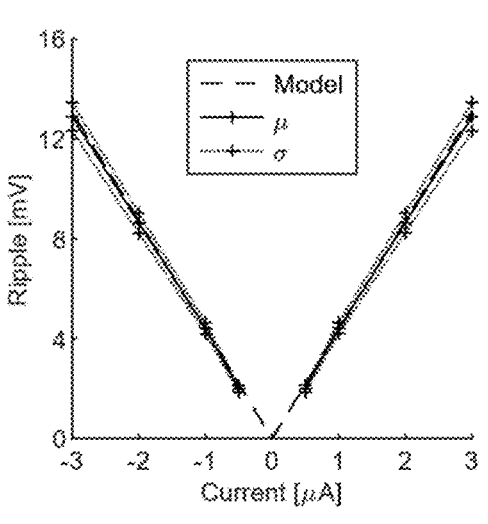
FIG. 28 is a graph of the output voltage ripple in function of the load current.
Figure 29:
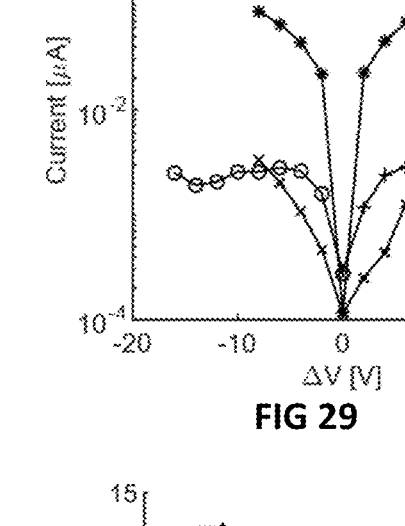
FIG. 29 is graph of the average channel-to-channel crosstalk before and after compensation.

Finally, FIG. 28 shows the channel-to-channel sequential crosstalk (μ and σ) before compensation (raw) and after compensation for V[i]=−8, 0, 8 V in function of ΔV=V[i]−

V[i−1]. With digital compensation, the crosstalk drops from a disturbing ≈100 nA to an unnoticeable ≈2 nA (0.2%).

V. Parallel Electrochemical Measurements

This section shows two classical electrochemical experiments, chronoamperometry and CV, which are sped up using multiple individual potentiostat channels. Before discussing those, first the experimental setup is described.

An external array of 128 square 500×500 mm² gold WE electrodes was used surrounded with a common platinum CE. A single, external Ag/AgCl reference electrode was used (3 M KCl, ALS, Japan, +0.205 V vs standard hydrogen electrode at 28°). The electrode array was placed in a rectangular reactor (10 cm×10 cm×2 cm) with 5 mM ferrocyanide and 1 M NaCl at 25° C.

Figure 30:
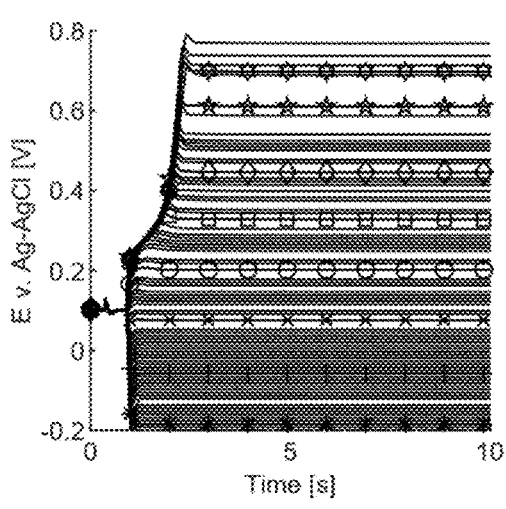
FIG. 30 and FIG. 31 are graphs showing respectively the potential and the current over time of a simultaneous chronoamperometry for all channels with. Of all channels, eight distinct ones, with uniform spacing, are marked.
Figure 31:
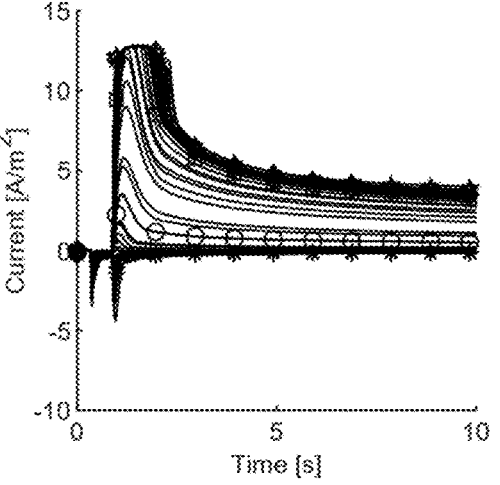

FIG. 30 and FIG. 31 shows the stimulation potential and recorded current for 128 simultaneous chronoamperometry experiments, with a different voltage step for each channel. For channel i, i=0, . . . , 127, the voltage step equals (−0.2+i)/128 V. This experiment illustrates the individual stimulation and sensing capabilities of the developed 128-channel potentiostat. As expected, a negative step results in a temporal negative current (to discharge the interface capacitance), while a positive step results in a positive current (to charge the interface capacitance). The larger the step, the larger the current spike, ultimately limited by the maximum current of the system. Without parallelism, this experiment would take 128× longer (43 min instead of only 20 s).

Figures 32, 33, 34, 35, 36, 37, 38, 39:
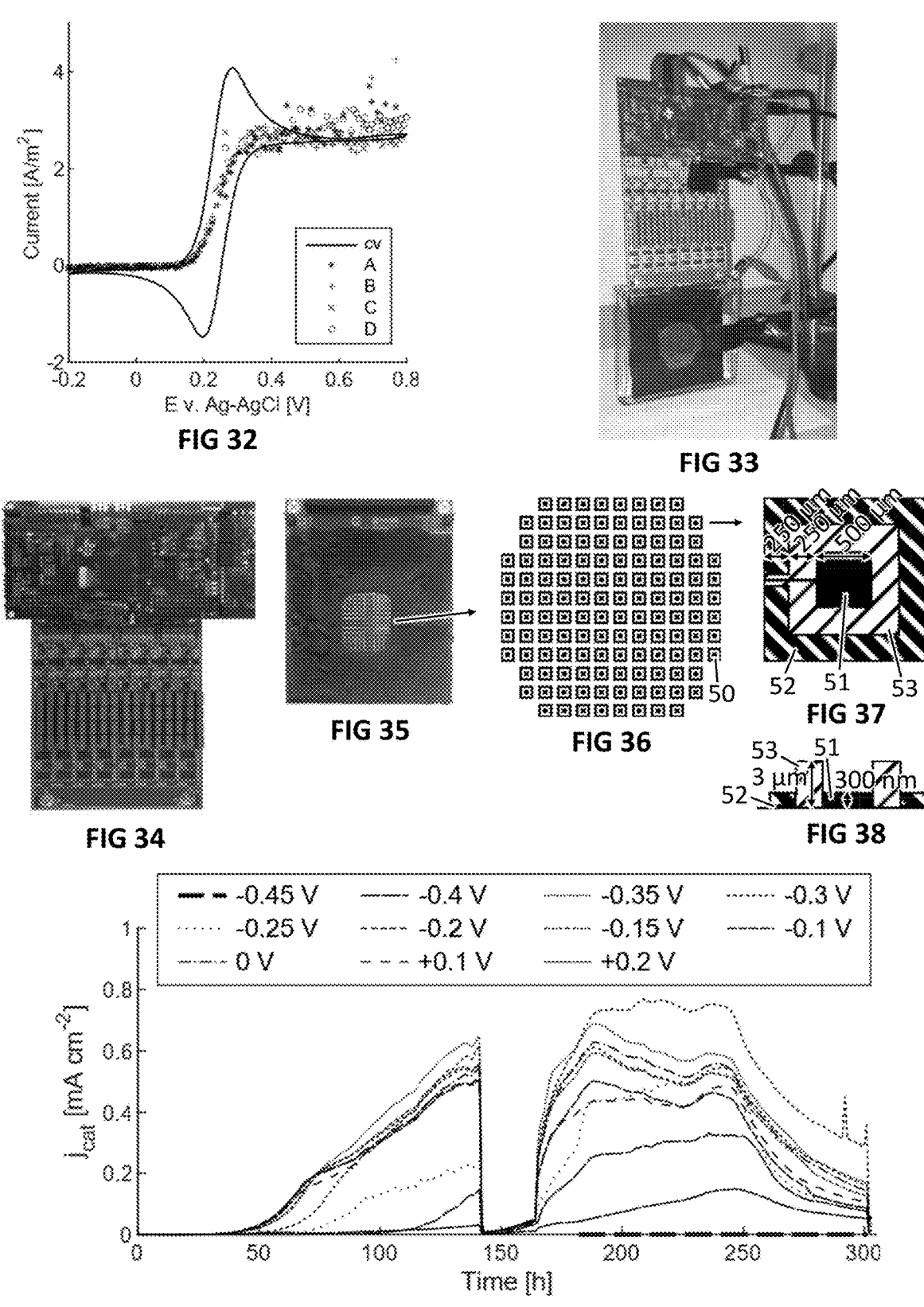
FIG. 32 is a graph of four (A-D) parallel CVs with a potential spread across 128 channels and a 5 mV·s$^{-1}$ reference slow CV (cv).
FIG. 33 is a photograph of a full electrochemical setup of a high-throughput electrochemical system in accordance with the present invention, with the 128-electrode array immerged in an electrolyte with a single reference electrode.
FIG. 34 is a photograph of a top view of the 128-channel potentiostat—in accordance with the present invention-shown in full electrochemical setup of FIG. 33. Further indicated are a connector to the PC for data monitoring and a connector to the 128-electrode array.
FIG. 35 is a photograph of a top view of the 128-electrode array shown in full electrochemical setup of FIG. 33, consisting of 128 gold working electrodes (500×500 μm) surrounded by a platinum counter electrode.
FIG. 36 is a schematic representation of the 128-electrode array of FIG. 35.
FIG. 37 and FIG. 38 are schematic representations showing respectively a top view and a side view of single element (50) in the array of FIG. 36, comprising a gold working electrode (51), platinum counter electrode (52) and a Parylene C barrier (53) separating both.
FIG. 39 is a graph showing the evolution of the catalytic current density over time for different electrode potentials. The average for each potential is represented; t=0 corresponds to the inoculation.

The second parallel experiment is a CV experiment with a very slow scan rate (in the order of 1 mV·s⁻¹) to measure the reaction polarization curve. This low scan rate is required to let transients settle but results in a long experiment duration, easily lasting 30 min for a single scan, and multiple scans are required for verification. This experiment can again be done much faster with multiple individual potentiostat channels. In this case, instead of sweeping all potentials on a single channel and recording the corresponding current, all channels are simultaneously set on a different potential and their steady-state current is measured after transient effects have faded out. The experiment duration was only 25 s (20 s transient and 5 s recording). The curve labelled 'cv' of FIG. 32 shows the average of 128 simultaneous 5 mV·s⁻¹-CV experiments. The scan rate was actually set a bit too fast as the redox peaks are still visible. The 4 sets A-D of FIG. 32 represent the measurements from the parallel CV, each with a different spread of the potential range across the 128 channels. The polarization curve from the parallel CV does not suffer from any remaining transient effect. Furthermore, the results of the four repeated measurements lie close to each other. Near the potential of 0.8 V, a few points have a larger deviation, caused by the sensitive chemical diffusion equilibrium.

Overall, the large number of individual channels thus speeds up slow electrochemical experiments by executing them in parallel; for example: chronoamperometry experiments can be done 128× faster, while a conventional 1 mV·s⁻¹-CV can be done 72× faster by sampling instead of voltage sweeping.

VI. Comparison with the State of the Art

The table below summarizes the specifications of the present example and compares them with the state-of-the-art research potentiostats (cf. background section).

| | Vergani (2012) | Giagkoulovits (2018) | Molderez (2019) | Adams (2019) | Manickam (2019) | Li (2019) | Jung (2020) | present example |
|---|---|---|---|---|---|---|---|---|
| Technology | PCB | 0.35 µm CMOS | PCB | PCB | 0.25 µm CMOS | 0.18 µm CMOS | 0.13 µm CMOS | PCB |
| WE stimulation | 1 | 16 | 6 | 1 | 1 | 64 | 16 | 128 |
| WE sensing | 24 | 256 | 6 | 1 | 1024 | 64 | 1024 | 128 |
| Voltage: | | | | | | | | |
| Range [V] | ±2 | 5.2 | ±2.56 | ±1.2 | — | 2.5 | — | ±10 |
| Accuracy [%] | — | — | 0.01 | 2 | — | — | — | 1 |
| Resolution [µV] | 3 | — | 78 | 600 | — | — | — | 305 |
| Ripple [mV] | none | none | none | none | none | none | none | 4 |
| Current: | | | | | | | | |
| Range [µA] | 10 | 13 | 4900 | 100 | 12.5e−3 | 1.1 | 59.9e−3 | 3.3 |
| Accuracy [%] | — | — | 0.1 | — | — | — | — | 1 |
| Resolution [pA] | 5 | 139 | 1.5e5 | 6000 | 0.28 | 1.1 | 2 | 100 |
| Bandwidth [kHz] | 100 | 150 | 5 | 1 | 0.05 | 117 @ 0.1 µA | 1000 | 20 |
| area/channel [mm$^2$] | — | 0.9 | 530 | 540 | 63 | 0.04 | 1.56 | 93 |
| cost/channel [$] | | — | 50 | 20 | — | — | — | 5 |

In comparison with the state-the-art MEAs, the present multichannel potentiostat contains 2× more individual stimulation channels. The amount of parallel sensing channels, equal to the amount of stimulation channels, is less than some of the prior art. The PCB technology with COTS components made a wider voltage range possible, up to ±10 V in comparison with 5.2 V of Giagkoulovits (2018). While the absolute current range differs a lot (because of the electrode area proportionality relation), the dynamic range is on par with that of the IC works. The bandwidth of the present multichannel however is less, but this was a calculated trade-off to have more parallel channels and in addition is not typically required for the target applications. Furthermore, the present example supports external sensor electrode array, which makes the instrument more versatile than these works with on-chip electrodes.

In comparison with the state-of-the-art commercial potentiostats, the amount of potential channels is 8× larger while the cost-per-channel is 200× to 2000× lower than their selling price. The channel voltage is on par, the current dynamic range is less as no dynamic scaling is used. The bandwidth performance again is much lower, a consequence of the time division multiplexing architecture.

In comparison with the state-of-the-art low-cost potentiostats, the amount of stimulation channels is 16× larger, the amount of sensing channels is 5× larger, the cost-per-channel is 4× lower and the area-per-channel is 5× smaller, which clearly illustrates the advantage of a time division multiplexing architecture and the disadvantage, a lower channel bandwidth.

Example 2: A Chip-Based 128-Channel Potentiostat for High-Throughput Studies of Bioelectrochemical Systems: Optimal Electrode Potentials for Anodic Biofilms Because of the tremendous speed difference between modern electronics and microorganism responses, a time-division multiplexed potentiostat channel architecture in accordance with Example 1 allows for an instrument with 128 channels at a low cost per channel. An accompanying 128 gold electrode array was designed using lithography technology on a separate board with flexible interconnection to the measurement instrument. Here we used this high-throughput system to assess the impact of the electrode potential on the growth and electrochemical performance of acetate-fed anodic mixed-community EABs. Due to some manufacturing imperfections, only 77 electrodes showed identical behaviour during an abiotic verification experiment and were therefore used to grow EABs at 11 constant potentials ranging from −0.45 V to +0.2 V vs. Ag/AgCl, with 7 replicates per potential. Cyclic voltammetry scans were recorded under both turnover (acetate saturation for EAB) and nonturnover (acetate-depleted) conditions to assess the apparent midpoint potential and the charge transport parameter of the respective EABs. The impact of the electrode potential on the final EAB volume was finally assessed by confocal microscopy. The vast amount of data recorded with sufficient replicates during a single experiment strengthen statistical significance and opens new opportunities for the field of electromicrobiology. The present setup can alleviate the recurrent limitation in data points and replicate numbers for performing a broad range of studies, such as: (i) optimization of the electric input applied to electrodes to maximize growth, current production or select for a community within EABs; (ii) screening for electroactivity of either pure cultures or diverse inocula over a broad range of potentials simultaneously spanning both cathodic and anodic putative DET, and (iii) fundamental studies relative to extracellular electron transfer mechanisms, associated thermodynamics and growth yield.

Figures 45, 46, 47, 48, 49:
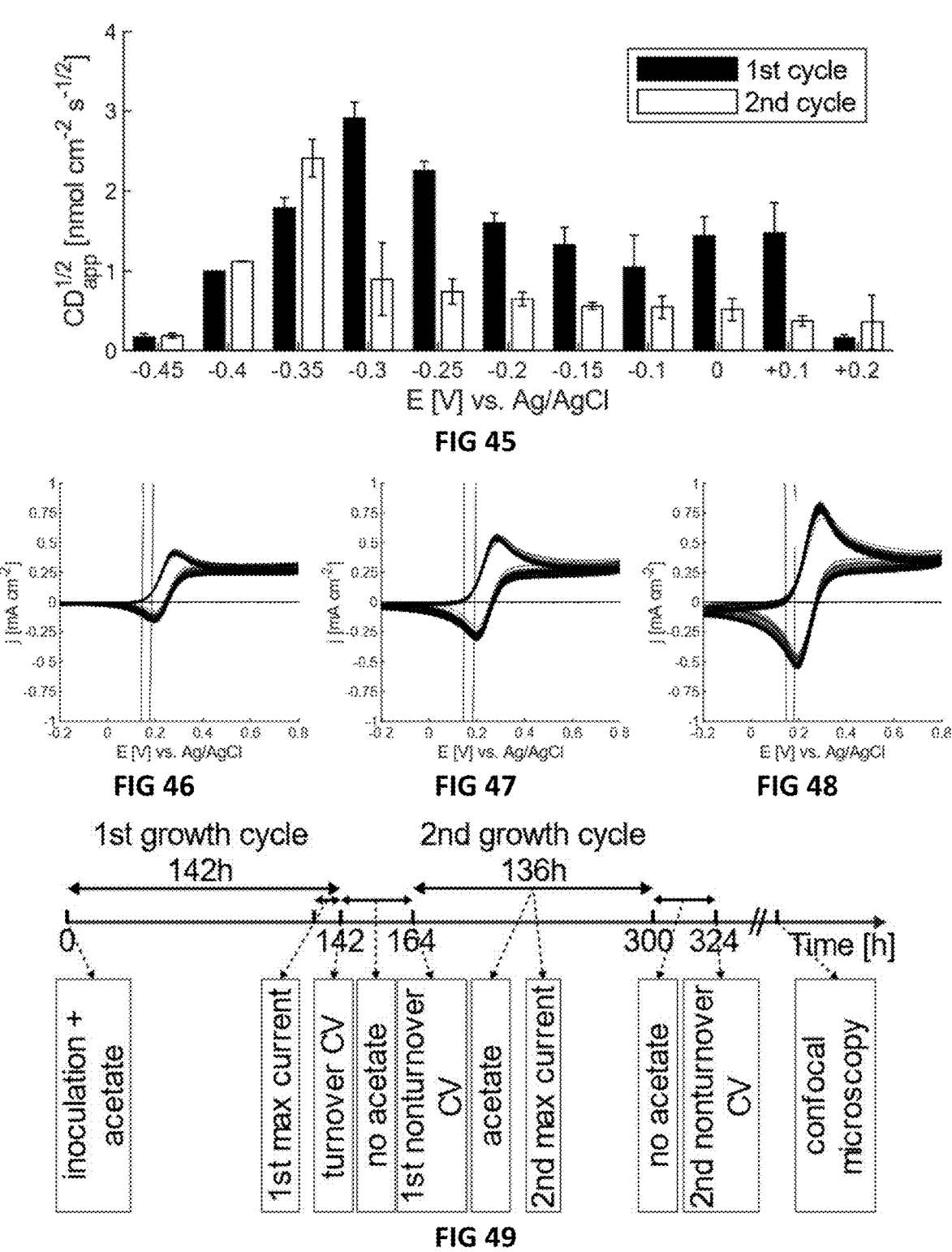
FIG. 45 is bar chart of the charge transport parameter (average and standard deviation) of the EAB after the first cycle (black) and after the second cycle (white).
FIG. 46, FIG. 47 and FIG. 48 are electrochemical verification CVs (128 electrodes, third cycle) in potassium ferrocyanide for respectively 10 mV·s$^{-1}$ (b) 20 mV·s$^{-1}$ and 50 mV·s$^{-1}$. Correctly manufactured electrodes (77) show a typical sigmoid response. Electrodes with a broken connection (51) show a horizontal line. Electrodes with a short connection show a vertical line.
FIG. 49 is a schematic representation of the experiment timeline for the 77 electrodes with the first and second growth cycle.

FIG. 49 shows the experiment timeline. At the end of the first growth cycle (142 h), the first maximum current is recorded and turnover CVs are performed. The electrodes are then placed in a second, equal reactor although without acetate. Nonturnover CVs are performed at 164 h. The electrodes are then placed in a third, equal reactor, again with acetate for a second growth cycle. During this whole second growth cycle, the overall maximum current is reported. After this second growth cycle, the electrodes are transferred in a fourth equal reactor without acetate. At 324 h, a second set of nonturnover CVs are preformed. Finally, the electrodes with the EABs are stored in the refrigerator (6° C.) before executing confocal microscopy.

I. Experiment Setup

The experiment setup, shown in FIG. 33, consists of three units: the 128-channel potentiostat, the 128-electrode array and the bioreactor.

A. The 128-Channel Potentiostat

A custom-designed, 128-channel potentiostat as detailed in Example 1 was used for EAB growth and electrochemical analysis (FIG. 33). A Delfino microprocessor (F28379D, Texas Instruments) was used to simultaneously and independently control the potential of the working electrodes (WEs) of the array, and to transfer the data to the PC. The data was visualized in real-time using MATLAB® for debugging purposes. The DC current and voltage circuitry of each channel was calibrated before use with a source meter (2450 SourceMeter, Keithley) resulting in a relative error below 1% for both current and voltage. The platform component cost was only $600 resulting in a cost-per-channel of $5.

B. The 128-Electrode Array

The 128-electrode array for EAB growth was external to the measurement board to allow testing of different electrode arrays (FIG. 35). The used 128-electrode array contained 128 WEs and 128 counter electrodes (CEs; FIG. 36). The CEs are all connected to the electronic ground potential. Each square WE measured 0.5×0.5 mm and used gold as top layer material. A box-shaped platinum CE surrounded each WE, with a 250 m insulated gap between WE and CE and 250 m width with a small opening for routing (FIG. 37 and FIG. 38). The used technology for the 128-electrode array production was lithography. A 3-inch diameter glass Pyrex 7740 wafer was thoroughly rinsed with acetone, isopropanol and deionized water, successively, then ultrasonicated for 15 min in deionized water and dried with $N_2$ gas. Lift-off was used for deposition of the platinum layer. The wafer was dehydrated for 5 min at 200° C. on a hotplate. Next, HDMS (3000 rpm, 45 s), 1 or 10B (3000 rpm, 45 s then soft baked at 180° C. for 5 min) and S1818 (4000 rpm, 45 s, then soft baked at 110° C. for 1 min) were successively spun and baked on a hotplate. The wafer was exposed with 42 mJ·m⁻² (wavelength 365 nm) using a chrome-on-glass-mask. Development was done in 351 developer, diluted 1:3 by volume in water. Then, a thin titanium adhesion layer was deposited (60 s, 200 W) and next a platinum layer (5 min, 80 W) using RF magnetron sputtering (Balzers BAE370). Lift-off was done in NMP overnight. Gold was deposited using the same procedure. Only the sputter parameters of the gold were different (3 min, 100 W). Next, the wafer was completely coated with 3 m of Parylene C (Plasma Parylene Systems Labcoater 300). The electrodes were etched free using the following protocol. The wafer was soft-baked for 5 min at 200° C. Next, HDMS (3000 rpm, 45 s) and ma-P1275 (3000 rpm, 30 s, then soft-baked at 120° C. for 2 min) were spun. Exposure was done using 300 mJ·m⁻² (365 nm wavelength) using a second chrome-on-glass mask to define the electrode openings in the Parylene C. Reactive-ion etching was done for 35 min at 100 W. The sample was diced and aluminium wire bonded to a separate printed circuit board (PCB), with an interface to the 128-channel PCB. The full PCB was coated with epoxy (EQ1016 QTX, Loctite) for electrical isolation and protection of the bondwires. An abiotic electrochemical control was performed with a dissolved redox probe (ferrocyanide) to verify the correct operation and the reproducibility of the electrode response.

C. Electrochemical Verification of the 128-Electrode Array

To assess the correct functionality of the 128-electrode array as well as possible differences due to manufacturing, an electrochemical verification experiment was run.

C.1. Materials and Methods

A square, abiotic reactor (10 cm×10 cm×2 cm) with 5 mM potassium ferrocyanide in 1 M NaCl at 25° C. was used. CVs were run twice with scan rates of 10 mV·s⁻¹, 20 mV·s⁻¹ and 30 mV·s⁻¹. The voltage range was set between –0.2 V to +0.8 V vs. Ag/AgCl. The current output was internally sampled at 651 Hz and next 16× downsampled by averaging. During post-processing, the current output was further subsampled to one sample per 10 mV. The third cycle of each CV was used to verify if an electrode operated correctly.

C.2. Results and Discussion

Electronic verification of the 128-electrode array was challenging because of the small dimensions (and corresponding time-intense electrode probing) in combination with the number of individual electrodes. Furthermore, the probing of an electrode resulted in a destructive scratch. Therefore, for only a few electrodes, the electrical resistance between the electrode and the connector was measured (which was in the order of 300). With load currents in the range of 1 μA, the resulting voltage error of 300 μV is negligible.

A second verification experiment uses ferrocyanide as a redox probe to assess the reproducibility of each electrode. The 128-electrode array was submersed in the ferrocyanide solution and equal CVs were run simultaneously on each individual electrode for different scan rates. FIG. 46-FIG. 48 show the third cycle of each electrode for the respective scan rates (i.e. 10 mV·s⁻¹, 20 mV·s⁻¹ and 50 mV·s⁻¹). A clear distinction can be seen between the voltammograms of electrodes that are manufactured correctly, which are closely matched and have a typical sigmoid response, and the voltammograms of electrodes with a manufacturing error, which either show no or almost no signal (horizontal line around 0) or show the maximum current of the 128-channel potentiostat (vertical line). In the first case, a manufacturing error probably resulted in a broken (or almost broken) connection. In the second case, a short connection arose between the WE and the CE. Of the 128 electrodes, 77 operated correctly resulting in a yield of 60%. This rather low yield together with a difficult and time-intense production process forms the bottleneck for further upscaling and paralleling potentiostat channels for high-throughput experiments. These 77 verified electrodes were subsequently used for bioelectrochemical experiments. The channels of the other, non-working electrodes were disabled using the electronic controllable switch of each channel and not further used.

D. Reactor Setup

The bioelectrochemical experiments were performed in a single-chamber, batch-fed, cylindrical 700 mL glass reactor. The reactor was placed in an anaerobic workstation (GP-Campus, Jacomex, TCPS NV, Rotselaar, Belgium) under a $N_2$:$CO_2$ (90:10, v/v) atmosphere controlled at 28° C. The reactor was filled with 500 mL of modified M9 medium (pH 7.5) including 24 mM sodium acetate as electron donor for the EABs. An Ag/AgCl reference electrode was immerged in the electrolyte in close proximity of the 128-electrode array (ALS, Japan, 3 M KCl, +0.205 V vs. standard hydrogen electrode at 28° C.). The electrolyte was continuously mixed with a magnetic stirrer rotating at 100 rpm. The reactor was inoculated with 25 mL (5 vol %) of fresh anolyte effluent from a continuous, acetate-fed bioelectrochemical system and the electrodes were immediately polarized at their respective potential.

II. Bioelectrochemical Experiments

The total experiment lasted 300 h (FIG. 49) with first an initial EAB growth monitored by chronoamperometry until most current started to stabilize (142 h). Next, turnover (t=142 h) and nonturnover (t=164 h) CVs were recorded for all electrodes. A second cycle of growth was carried out until the current dropped to almost zero (300 h). A second nonturnover CV was then recorded (324 h). Finally, the biofilm volume was derived from confocal microscopy imaging.

A. Initial EAB Growth

The bioelectrochemical experiment was simultaneously performed with 77 electrodes to assess the impact of 11 constant electrode potentials (7 replicates per potential). The electrodes were during 142 h poised at: −0.45 V, −0.4 V, −0.35 V, −0.3 V, −0.25 V, −0.2 V, −0.15 V, −0.1 V, 0 V, +0.1 V and +0.2 V vs. Ag/AgCl. The current output was internally sampled by chronoamperometry at 651 Hz and before being transmitted to an external PC, downsampled 16 times by averaging. During post-processing, outliers were removed using a moving median filter (window size of 2 h), Gaussian lowpass filtered (window size of 2 h) and subsampled to one sample per hour.

For each of the 11 potential groups, the average current density was reported. Outliers, i.e. electrodes that showed no growth, were removed from the dataset and reported separately. For one anode potential setting, −0.4 V, only a single electrode showed EAB growth and thus no standard deviations could be calculated. The averaged current density was either integrated over time for each group to obtain the average of total accumulated charge, or differentiated for each group to obtain the increase rate in current. The maximum current densities for the first growth cycle were calculated from the averaged current between t=141 h and t=142 h.

B. Intermediate Turnover and Nonturnover CVs Recording

Turnover CVs were run 142 h after inoculation and polarization, once most catalytic currents had started to stabilize. They were carried out with a scan-rate of 5 mV·s$^{-1}$, 10 mV·s$^{-1}$ and 20 mV·s$^{-1}$, from −0.65 V to +0.3 V and with at least three successive cycles. The current output was internally sampled at 651 Hz and downsampled 2048 times by averaging. During post-processing, the current output was further subsampled to one sample per 10 mV. Represented CVs and corresponding data are from the third cycle. Anodic plateau currents were calculated from the averaged current between +0.2 V and +0.25 V of the CV recorded at 5 mV·s$^{-1}$. The apparent midpoint potential E$_{1/2}$ was derived from the average of the inflection point of the forward and backward scan CV, i.e. the half wave potential of the sigmoid polarization curves.

After these turnover CVs, the electrodes were placed in a second, equal setup but with acetate-free M9 to perform nonturnover CVs. The current was allowed to stabilize close to zero for 22 h before performing the nonturnover measurements to extract a charge transport parameters across the EABs. The scan rates were 10 mV·s$^{-1}$, 20 mV·s$^{-1}$, 40 mV·s$^{-1}$, 60 mV·s$^{-1}$, 80 mV·s$^{-1}$, 100 mV·s$^{-1}$, 120 mV·s$^{-1}$, 140 mV·s$^{-1}$, 160 mV·s$^{-1}$, 180 mV·s$^{-1}$ and 200 mV·s$^{-1}$ from −0.65 V to +0.3 V. The current output was internally sampled at 651 Hz and downsampled 32 times by averaging. During post-processing, the current output was further subsampled to one sample per 10 mV. Represented CVs and corresponding data are from the third cycle. The charge transport parameter $$CD_{app}^{1/2}$$

(i.e. the product of an apparent charge carrier concentration C and the square root of the apparent diffusion coefficient for the electrons Dapp) was derived from the Randles-Ševčík equation. For all scan rates, the maximum current and background current of the forward scan were extracted and averaged over multiple cycles to obtain the anodic peak currents. The charge transport parameter was estimated from the linear regression between those peak currents and the square root of the scan rate at which they were recorded.

C. Second Cycle of Growth with Acetate and Associated Measurements

After the turnover and nonturnover CV experiments, the electrodes were placed in a third, equal reactor, with 24 mM acetate for a second growth period (144 h to 300 h), with identical experiment conditions and settings. During this second cycle, the maximum current density (averaged over one hour) of each electrode potential was recorded. When current started dropping (after 300 h since inoculation), the electrodes were for a fourth time transferred to an equal reactor (without acetate) for a second set of nonturnover CVs after 324 h (with equal settings as the first set).

D. Confocal Microscopy Experiments

Live-dead staining was done on hydrated EABs at the end of the experiment using a previously described protocol. The EABs were visualized with a Nikon A1R confocal laser scanning microscopy (ten times magnified with an air lens with numerical aperture of 0.45). A complete Z-stack was made of at least 3 electrodes for each of the 11 distinct potentials, although for some electrodes, the staining procedure failed, resulting in no reported standard deviations. The 3D biofilm volume was estimated using MATLAB®. The image was 3D Gaussian filtered to remove noise. Locations with a clear staining error were manually removed. The image was then coarsely divided into a biofilm region and a non-biofilm region. A plane was fit through the non-biofilm region, i.e. the bottom of the electrode, to compensate for tilting. The biofilm border was defined as the region of maximum intensity. Knowing the electrode surface and the biofilm border, the height of each pixel of the biofilm was calculated from the difference between the biofilm border and the electrode surface, multiplied by the z-step and a correction factor for the (air-liquid) refraction. Finally, the volume was calculated by summing all heights and multiplying them with the area of each pixel.

III. Results and Discussion

A. Initial Growth of EAB and Electrochemical Characterization

The relevant potentials to be explored were determined based on previous studies and the observed CV of the EABs, resulting in a potential between −0.45 V to +0.2 V. This spans the full potential range of a typical sigmoid polarization curve for acetate-fed microbial anodes, including several potentials within the anodic plateau which is reached at −0.22 V. From the electrochemical verification experiment of the 128-electrode array, only 77 operated correctly with reproducible results (see Example 2.I.C), which associates with the manual production approach existing so far for the 128-electrode array. This number allowed to explore 11 different potentials to grow EABs with 7 replicates per potential.

About 25 h after inoculation, the catalytic current density started increasing exponentially on most electrodes (60 out of 77), illustrating the colonization of their surface by electroactive bacteria and the growth of EABs (FIG. 39). Exponential growth lasted until t≈70 h. From then, the catalytic currents increased almost linearly until t=140 h, at which they started to stabilize for most electrodes. For any set of electrodes poised at a specific potential, the maximal standard deviation of the catalytic current density remained below 50 $\mu A \cdot cm^2$ i.e. a relative standard deviation ≤10% (except for the extreme anode potentials of −0.45 V, −0.4 V and +0.2 V). Current production was minimal at extreme electrode potentials (−0.45 V and +0.2 V) and lower on electrodes −0.4 V and −0.35 V (FIG. 40) which explains the higher relative variability. The 5 sets of electrodes poised at potentials ranging from −0.2 V to +0.1 V exhibited very similar current evolution and maximum current reached [≈(540±23) $\mu A \cdot cm^{-2}$]. This is not surprising considering that all potentials are positioned on the anodic plateau of the sigmoid polarization curve (assuming that the polarization curves stay invariable with the growth potential—vide infra). As such, from a kinetic perspective, the flux of electrons entering the electron transport chain of the electroactive microorganism(s) is maximized at those potentials. Furthermore, following a classic Nernstian model, one can assume that the redox protein(s) performing the heterogeneous electron transfer are fully oxidized at the electrode interface polarized within the plateau potential. From a thermodynamics point of view, this maximizes the oxidized ratio of the intracellular redox partners involved in electron transport, and ultimately of the NAD+/NADH couple directly involved in energy generation, allowing for the electroactive bacteria to fully exploit the thermodynamic frame coupling acetate oxidation and DET. By maximizing both the electron transfer rate and presumably the amount of energy per electron, it appears reasonable that EAB grown at plateau potentials exhibit very similar and highest initial growth rate and associated current development. Conversely, a very different behaviour was observed for EAB grown at the highest potential tested of +0.2 V vs. Ag/AgCl. Here the current evolution was much slower, and the maximum current reached after 140 h was only (32±6) $\mu A \cdot cm^{-2}$, which is 6% of the current produced by the EABs grown at all lower plateau potentials. Here a more complex phenomenon than simple kinetics and thermodynamics considerations must likely be at stake and a similar observation of lower performance at high electrode potentials (in this case of +0.6 V vs. Ag/AgCl) was made earlier (Dennis et al., 2016). One may note that +0.2 V was the only potential tested that is above the −0.37 V to 0.15 V vs. Ag/AgCl range for apparent midpoint potentials of solid Fe and Mn (hydr) oxides reducible by *G. sulfurreducens* (Levar et al., 2017), the model organism for anodic DET. Though we did not assess the microbial community in the present study, our acetate-fed EABs were always having *Geobacter* spp. as most abundant taxon at the genus level, which include species that are mostly known for their metal reduction capabilities. One may speculate that the redox partners (presumably c-type cytochromes) performing the DET may not be evolutionary optimized to give electrons at such high potentials, and that electroactive bacteria may detect/adhere/grow better on electrodes poised at potentials similar to those of their natural solid terminal electron acceptors.

Further investigation including electrodes poised at even higher potentials would help unravel this phenomenon.

The current produced by EABs grown just below the anodic plateau potential, at −0.25 V, evolved similarly than those poised at plateau potentials, but reached a slightly higher maximal current at t=140 h [≈(650±23) $\mu A \cdot cm^{-2}$ vs. ≈(540±23) $\mu A \cdot cm^{-2}$]. At the lower potential −0.3 V, the current evolution was substantially delayed, but then increased faster than for any other EAB after t≈70 h before reaching (625±47) $\mu A \cdot cm^{-2}$ after 140 h of polarization. The delay in initial current evolution was further increased when lowering the electrode potential (−0.35 V and −0.4 V). This longer lag phase appears rational considering these conditions of restricted energy harvest for the electroactive bacteria.

B. Turnover Cyclic Voltammetry

Figures 40, 41, 42, 43, 44:
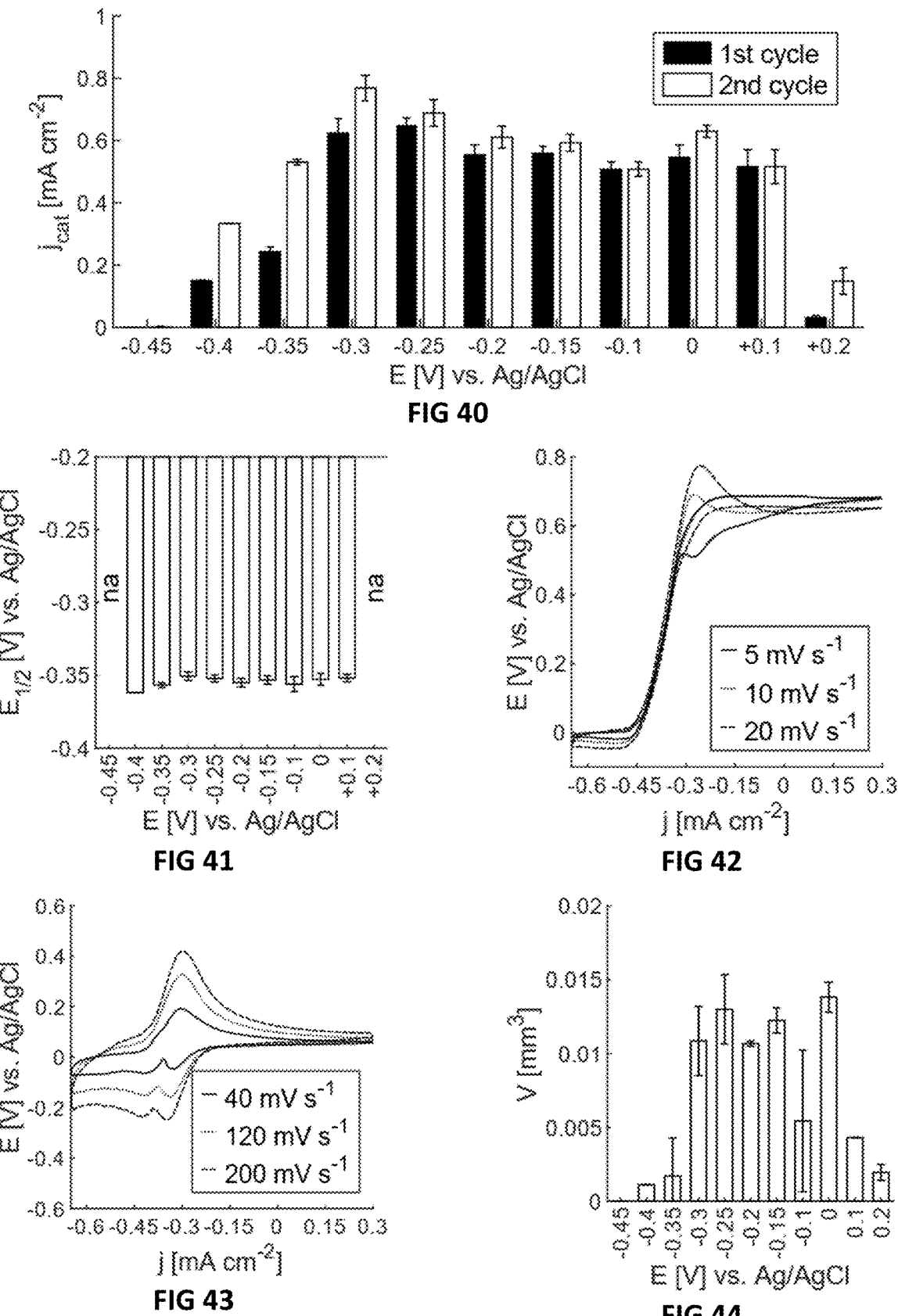
FIG. 40 is a bar chart of the maximum catalytic current density reached during the first (black) and second (white) growth cycle.
FIG. 41 is bar chart of the apparent midpoint potential (average and standard deviation) of the EABs in the first cycle.
FIG. 42 and FIG. 43 are graphs showing respectively representative turnover cyclic voltammetry scans (electrode 1 of −0.3 V), and representative nonturnover cyclic voltammetry scans of the same electrode.
FIG. 44 is a bar chart of the volume of hydrated EABs at the end of the experiment.

A set of turnover CVs were carried out at t=142 h to assess the current-potential relation (FIG. 42). The turnover CVs exhibited the usual sigmoid curves observed for *Geobacter* spp. (dominated or pure) EABs for all active electrodes, except for the single EAB grown at the lowest potentials of −0.45 V and −0.4 V where transient features (peaks) overcome the small "steady-state" catalytic feature (sigmoid). The well-defined sigmoid shapes illustrate the occurrence of a kinetically non-limiting (quasi-)reversible heterogeneous electron transfer at the EAB/electrode interface. The anodic plateaus of all polarization curves were reached at about −0.22 V vs. Ag/AgCl. The only significant difference in the shape of the turnover CVs of identical scan rate appears to be the extent of small transient peaks at the beginning of the anodic plateau (FIG. 42). Those were substantially larger for EABs grown at lower potentials (≤−0.3 V) i.e. at potentials below the anodic plateau. This could be due to a larger amount (or concentration) of redox partners for the EABs grown at those lower potentials, implying a larger charge storage ability and therefore larger relative contribution of the transient peaks with respect to the "steady-state" catalytic current represented by the sigmoid. A somehow unexpected feature of the turnover CV of the EABs grown at lowest potential (−0.4 V and −0.35 V), for which we do not have an explanation, was that their anodic plateau current was lower than the catalytic current just previously recorded during the chronoamperometry at their respective potential, conversely to what would be expected from a conventional Nernstian electrochemical system.

FIG. 41 shows the extracted global midpoint potential ($E_{1/2}$) for the turnover CVs. Recordings for −0.45 V were unreliable due to the non-sigmoid shape of the corresponding turnover CV. The value for $E_{1/2}$ was −0.35 V for all other potentials of growth, which corresponds well with the existing literature for either *Geobacter sulfurreducens* or *Geobacter* spp. dominated EABs. The identity of $E_{1/2}$ for all EABs suggests that the applied electrode potential did not impact the nature of the main redox partner(s) performing the heterogeneous electron transfer.

The 128-electrode array was then transferred to an acetate free medium to successively record nonturnover CVs at different scan rates (FIG. 43). Usual redox peaks were displayed surrounding the apparent midpoint potential of −0.35 V. The amplitude of the redox peaks is associated with the amount (and/or concentration) of the microbially produced charge carriers and the ability of the EABs to transport electrons across their conductive matrix. The anodic peak currents were increasing linearly with the square root of the scan rate, as predicted by the classic model of charge transport involving a semi infinite diffusion process. From the Randles-Ševčík equation, one can derive a charge transport parameter characteristic of the conductivity of the EABs $$(CD_{app}^{1/2}),$$

where C would correspond to an average concentration of charge carriers (in electron equivalent) and Dapp an apparent diffusion coefficient for the electrons (Zhang et al., 2017) across the EAB. Electrodes that were poised at both extreme potentials (−0.45 V and +0.2 V) did not exhibit clear redox peaks, and no estimations are therefore provided. Only one electrode at −0.4 V showed peaks, resulting in the absence of a standard deviation. The charge transport parameter was similar for EABs grown at plateau potentials (from −0.2 V to +0.1 V) at $(1.4\pm0.3)$ nmol·cm$^{-2}$·s$^{-1/2}$. It was higher for EABs grown slightly below the plateau potential (from −0.35 V to −0.25 V), with a maximum of $(2.9\pm0.3)$ nmol·cm$^{-2}$·s$^{-1/2}$ for EABs grown at −0.3 V. This suggests that those EABs grown at "suboptimal potentials" may be more concentrated in charge carriers and/or more conductive than their counterparts grown at plateau potentials. Poising electrodes at those suboptimal potentials induces a relative limitation in electron acceptor availability for the electroactive microorganisms. Planktonic *Geobacter sulfurreducens* has been shown to overexpress c-type cytochromes (charge carriers presumably involved in electron transport mechanism) when under electron acceptor limitation. We also observed that charge carrier concentrations increased by more than 3 times in acetate-fed EABs periodically polarized at plateau potential and left under open circuit (i.e. periodically under electron acceptor limitation). Similarly, an increase in catalytic current was observed for O$_2$-reducing microbial cathodes poised at a "suboptimal potential" close to the $E_{1/2}$ of their sigmoid polarization curve. All those results suggest that electroactive bacteria may compensate for the lower electron flux (and presumably the lower energy per electron) induced by suboptimal potentials, by overexpressing redox partners involved in the mechanisms of extracellular electron transfer. This could be attractive to increase resolution of such measurements in a context of e.g. sensor systems. Finally, the Bond group has shown that to optimize energy harvest, *Geobacter sulfurreducens* can express different inner membrane cytochromes to extract electrons from their quinone pool depending on the redox potential of its solid final electron acceptor. The critical electrode potential at which one or another electron pathway is favoured, was found to be −0.1 V vs. SHE (i.e. −0.305 V vs. Ag/AgCl). They suggest that this ability to use different inner redox pathways depending on electrode potential may represent a common trait amongst *Geobacter* strains. We cannot exclude that a similar selection of optimal electron transport chain occurred for our electroactive microorganisms, ultimately leading to different maximum current densities.

C. Second Growth Cycle and Second Nonturnover CV Experiments

The electrodes were transferred to a third equal reactor with 24 mM sodium acetate for a second growth cycle and were poised at their previous respective potential. The catalytic current density of all electrodes that previously showed electroactivity mostly recovered after about 10 h of polarization (FIG. 39, while other electrodes did not start to produce catalytic current. Between t=180 h and t=250 h, all active electrodes reached a maximum, relatively stable current density plotted on FIG. 40. Similarly than for the first growth cycles, the electrodes poised at plateau potential (≥−0.2 V vs. Ag/AgCl) reached almost identical maximum currents of $(572\pm56)$ µA·cm$^{-2}$ (n=35 electrodes) except for the highest potential of +0.2 V for which the current density was much lower at $(149\pm42)$ µA·cm$^{-2}$. The maximum current was very similar between the first and second cycle for electrodes poised between −0.2 V to +0.1 V. Conversely, it substantially increased during the second cycle for the 21 EABs polarized below plateau potential (−0.4 V to −0.3 V). The relative enhancement of the current between the two cycles increased when the potential decreased, confirming the hypothesis of lower growth and/or electroactivity improvement at those lower potentials. The two highest catalytic current densities were reached for electrodes poised at −0.3 V [$(769\pm41)$ µA·cm$^2$] and −0.25 V [$(650\pm23)$ µA·cm$^{-2}$, n=7], i.e. the two first potentials studied below the plateau of the polarization curves. These electrodes also generated the largest total charge. After t=250 h, the current density of all electrodes decreased probably because of acetate depletion. At 300 h, the electrodes were transferred to a fourth equal reactor without acetate to perform a second set of nonturnover CVs. The charge transport parameter $$(CD_{app}^{1/2})$$

substantially decreased between the two growth cycles for the EABs polarized between −0.3 V to +0.1 V, and slightly increased for EABs poised at +0.2 V and at potentials ≤−0.35 V (FIG. 45). At the end of the experiment, it reached a maximum at −0.35 V [$(2.4\pm0.2)$ nmol·cm$^2$·s$^{-1/2}$] followed by −0.4 V $(1.1$ nmol·cm$^{-2}$·s$^{-1/2})$ and −0.3 V [$(0.90\pm0.5)$ nmol·cm$^{-2}$·s$^{-1/2}$]. This result further suggests that growth at so-called "suboptimal potentials" (i.e. below plateau potentials) but ≤$E_{1/2}$ (i.e. −0.35 V) develops more conductive and efficient EABs, though in a slower fashion.

D. Morphology and Volume of EABs

At the end of the experiment, the morphology of EABs was recorded by confocal microscopy. Images confirm that no EAB developed on electrodes poised at −0.45 V. On other electrodes that produced current, biofilms covered a slightly larger area than the 0.5×0.5 mm$^2$ gold square and exhibited a rather flat top layer. The average thickness (i.e. the volume) of the EABs showed some variations (FIG. 44). Reliability of data for EAB poised at −0.1 V and +0.1 V is limited because of failure of the staining procedure. Biofilms grown at −0.3 V, −0.25 V, −0.2 V, −0.15 V and 0 V had similar volume of $(1.22+0.14)\times10^{-2}$ mm$^3$, whereas EABs polarized at −0.4 V $(1\times10^{-3}$ mm$^3)$ and +0.2 V [$(2.0\pm0.5)\times10^{-3}$ mm$^3$] had a much lower volume which correlates with their lower recorded current densities. Finally, EABs that developed at −0.35 V exhibited considerably lower volumes [$(1.7\pm2.6)\times 10^{-3}$ mm$^3$, n=3] than other EABs that delivered similar maximum current densities. This results seems in good adequation with the facts that (i) those EABs grown at $E_{1/2}$ had a much higher charge transport parameter than their counterparts grown at higher potentials (FIG. 45), i.e. that those more conductive EABs may be able to deliver more current per volume of biomass, and (ii) their catalytic current was still substantially increasing between t=200 h and t=250 h while the currents from other EABs were stable or already decreasing, suggesting that EABs were still considerably growing until acetate started to be depleted. As such, one may conjecture that the volume and the electrochemical performance of those EABs grown at $E_{1/2}$ could have increased further if a third growth cycle would have been carried out.

It is to be understood that although preferred embodiments, specific constructions and configurations, as well as materials, have been discussed herein for devices according to the present invention, various changes or modifications in form and detail may be made without departing from the scope and technical teachings of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A stimulation circuitry for a multichannel potentiostat having individually controllable stimulation channels, comprising at least one circuit group, the circuit group comprising:
    (i) a controllable current source;
    (ii) a transient suppression module having an input resistively coupled to an output of the current source, the transient suppression module being a module for controllably suppressing a transient current with respect to an output of said transient suppression module;
    (iii) a demultiplexer having an input resistively coupled to the output of the transient suppression module; and
    (iv) a controller for selecting an output of the demultiplexer and for operating the transient suppression module with respect to said output selection.

2. The stimulation circuitry according to claim 1, wherein the transient suppression module comprises:
    (ii') a voltage buffer, and
    (ii") a switch having
    an input resistively coupled to the output of the current source,
    a first output resistively coupled to the voltage buffer, and
    a second output resistively coupled to an input of the demultiplexer.

3. The stimulation circuitry according to claim 2, wherein the voltage buffer is a negative-feedback amplifier.

4. The stimulation circuitry according to claim 1, wherein the circuit group further comprises:
    (v) a plurality of stimulation channels, each stimulation channel comprising:
    (v') a capacitor having a first terminal resistively coupled to an output of the demultiplexer, and
    (v") a working electrode connector resistively coupled to the capacitor's first terminal.

5. The stimulation circuitry according to claim 4, wherein the working electrode connector is resistively coupled to the first terminal through a switch.

6. The stimulation circuitry according to claim 1, wherein the current source comprises a modified Howland current pump.

7. A multichannel potentiostat having individually controllable stimulation channels, comprising the stimulation circuitry according to claim 1.

8. The multichannel potentiostat according to claim 7, further comprising a sensing circuitry.

9. The multichannel potentiostat according to any of claim 8, wherein the sensing circuitry comprises at least one circuit group, the circuit group comprising:
    a first sensing path coupled to the input of the demultiplexer, and
    a second sensing path comprising a multiplexer having a plurality of inputs resistively coupled to a working electrode connector each.

10. The multichannel potentiostat according to claim 9, comprising at least 25 stimulation channels.

11. The multichannel potentiostat according to claim 7, having stimulation channels and sensing channels, the number of stimulation channels being at least 30% of the number of sensing channels.

12. A use of a multichannel potentiostat as defined in claim 7 for concurrently performing a plurality of electrochemical measurements in parallel for bioelectrochemical measurements.

13. The multichannel potentiostat according to claim 7, having stimulation channels and sensing channels, the number of stimulation channels being at least 40% of the number of sensing channels.

14. The multichannel potentiostat according to claim 7, having stimulation channels and sensing channels, the number of stimulation channels being at least 50% of the number of sensing channels.

15. A method for operating a stimulation circuitry as defined in claim 1, comprising using the controller to select an output of the demultiplexer while suppressing a transient current with respect to the output of the transient suppression module.

16. A method for operating a multichannel potentiostat having individually controllable stimulation channels, comprising the method according to claim 15 and further comprising:
    (a) determining a potential of a sensing channel associated with a working electrode connector, and
    (b) setting, in function of the determined potential, a stimulation current for achieving a predetermined target potential for a stimulation channel associated with the same working electrode connector.

17. A use of a transient suppression module, being a module for controllably suppressing a transient current with respect to an output of said transient suppression module, for reducing a minimum current pulse time needed to achieve a predetermined delivered charge accuracy in a stimulation circuitry for a multichannel potentiostat.

\* \* \* \* \*